(12) United States Patent
Benfield et al.

(10) Patent No.: US 8,032,625 B2
(45) Date of Patent: Oct. 4, 2011

(54) METHOD AND SYSTEM FOR A NETWORK MANAGEMENT FRAMEWORK WITH REDUNDANT FAILOVER METHODOLOGY

(75) Inventors: Jason Benfield, Austin, TX (US); Oliver Yehung Hsu, Austin, TX (US); Lorin Evan Ullmann, Austin, TX (US); Julianne Yarsa, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 2894 days.

(21) Appl. No.: 09/895,085

(22) Filed: Jun. 29, 2001

(65) Prior Publication Data

US 2003/0009551 A1     Jan. 9, 2003

(51) Int. Cl.
*G06F 15/173* (2006.01)
(52) U.S. Cl. ............... 709/224; 709/223; 714/4.1
(58) Field of Classification Search .......... 709/201, 709/223, 224, 230; 718/1, 100, 2; 714/4.1
See application file for complete search history.

(56) References Cited

U.S. PATENT DOCUMENTS

| | | | | |
|---|---|---|---|---|
| 5,303,243 A * | 4/1994 | Anezaki | ............ | 714/13 |
| 5,960,439 A * | 9/1999 | Hamner et al. | ........... | 707/103 R |
| 6,058,103 A * | 5/2000 | Henderson et al. | ........... | 370/254 |
| 6,202,169 B1 * | 3/2001 | Razzaghe-Ashrafi et al. | .... | 714/6 |
| 6,202,170 B1 * | 3/2001 | Busschbach et al. | ........... | 714/11 |
| 6,269,396 B1 * | 7/2001 | Shah et al. | ..................... | 709/223 |
| 6,411,997 B1 * | 6/2002 | Dawes et al. | ................. | 709/224 |
| 6,670,973 B1 * | 12/2003 | Hill et al. | ...................... | 715/853 |
| 7,310,666 B2 * | 12/2007 | Benfield et al. | ............... | 709/223 |
| 7,389,217 B2 * | 6/2008 | Benny et al. | ................. | 709/230 |
| 7,487,079 B2 * | 2/2009 | Benny et al. | ................. | 709/230 |
| 2003/0051195 A1 * | 3/2003 | Bosa et al. | ..................... | 714/43 |

* cited by examiner

*Primary Examiner* — Ramy Osman
(74) *Attorney, Agent, or Firm* — Yee & Associates, P.C.; Jeffrey S. LaBaw

(57) ABSTRACT

A method, system, apparatus, and computer program product is presented for management of a distributed data processing system. Resources within the distributed data processing system are dynamically discovered, and the discovered resources are adaptively monitored using the network management framework. When the network management framework detects that certain components within the network management framework may have failed, new instances of these components are started. If duplicate components are later determined to be active concurrently, then a duplicate component is shutdown, thereby ensuring that at least one instance of these components is active at any given time. After certain failover events, a resource rediscovery process may occur, and a topology database containing previously stored information about discovered resources is resynchronized with resource information about rediscovered resources.

27 Claims, 13 Drawing Sheets

METHOD AND SYSTEM FOR A NETWORK MANAGEMENT FRAMEWORK WITH REDUNDANT FAILOVER METHODOLOGY

BACKGROUND OF THE INVENTION

1. Field of the Invention

The present invention relates to an improved data processing system and, in particular, to a method and system for multiple computer or process coordinating. Still more particularly, the present invention provides a method and system for network management.

2. Description of Related Art

Technology expenditures have become a significant portion of operating costs for most enterprises, and businesses are constantly seeking ways to reduce information technology (IT) costs. This has given rise to an increasing number of outsourcing service providers, each promising, often contractually, to deliver reliable service while offloading the costly burdens of staffing, procuring, and maintaining an IT organization. While most service providers started as network pipe providers, they are moving into server outsourcing, application hosting, and desktop management. For those enterprises that do not outsource, they are demanding more accountability from their IT organizations as well as demanding that IT is integrated into their business goals. In both cases, "service level agreements" have been employed to contractually guarantee service delivery between an IT organization and its customers. As a result, IT teams now require management solutions that focus on and support "business processes" and "service delivery" rather than just disk space monitoring and network pings.

IT solutions now require end-to-end management that includes network connectivity, server maintenance, and application management in order to succeed. The focus of IT organizations has turned to ensuring overall service delivery and not just the "towers" of network, server, desktop, and application. Management systems must fulfill two broad goals: a flexible approach that allows rapid deployment and configuration of new services for the customer; and an ability to support rapid delivery of the management tools themselves. A successful management solution fits into a heterogeneous environment, provides openness with which it can knit together management tools and other types of applications, and a consistent approach to managing all of the IT assets.

With all of these requirements, a successful management approach will also require attention to the needs of the staff within the IT organization to accomplish these goals: the ability of an IT team to deploy an appropriate set of management tasks to match the delegated responsibilities of the IT staff; the ability of an IT team to navigate the relationships and effects of all of their technology assets, including networks, middleware, and applications; the ability of an IT team to define their roles and responsibilities consistently and securely across the various management tasks; the ability of an IT team to define groups of customers and their services consistently across the various management tasks; and the ability of an IT team to address, partition, and consistently reach the managed devices.

Many service providers have stated the need to be able to scale their capabilities to manage millions of devices. When one considers the number of customers in a home consumer network as well as pervasive devices, such as smart mobile phones, these numbers are quickly realized. Significant bottlenecks appear when typical IT solutions attempt to support more than several thousand devices.

Given such network spaces, a management system must be very resistant to failure so that service attributes, such as response time, uptime, and throughput, are delivered in accordance with guarantees in a service level agreement. In addition, a service provider may attempt to support many customers within a single network management system. The service provider's profit margins may materialize from the ability to bill usage of a common management system to multiple customers.

On the other hand, the service provider must be able to support contractual agreements on an individual basis. Service attributes, such as response time, uptime, and throughput, must be determinable for each customer. In order to do so, a network management system must provide a suite of network management tools that is able to perform device monitoring and discovery for each customer's network while integrating these abilities across a shared network backbone to gather the network management information into the service provider's distributed data processing system.

Hence, there is a direct relationship between the ability of a management system to provide network monitoring and discovery functionality and the ability of a service provider using the management system to serve multiple customers using a single management system. Preferably, the management system can replicate services, detect faults within a service, restart services, and reassign work to a replicated service. By implementing a common set of interfaces across all of their services, each service developer gains the benefits of system robustness. A well-designed, component-oriented, highly distributed system can easily accept a variety of services on a common infrastructure with built-in fault-tolerance and levels of service.

Prior art network management packages generally contain some type of topology display application for allowing a system administrator to graphically view the devices within a network and the relationships between those devices. Given a scenario in which a service provider is using an integrated network management system for multiple customers in a highly distributed system comprising on the order of a million devices, though, it is most likely that many different individuals will be assigned to manage different customers, different regions, and different groups of devices, each of whom may be taking actions on portions of the network. With a very large network of more than a million devices, significant effort is required to maintain a database of accurate topology information.

Although a corporate network or a department-level local area network may be relatively stable with a relatively unchanging topology, a very large network may undergo constant change as devices within the network fail and/or automatically reconfigure, thereby resulting in frequent changes to the topology of the network. After a failover event, any topology information that was previously stored within a topology database would be inaccurate if not corrected. The ability to maintain accurate topology information is complicated by the fact that there may be failure events within the network management framework itself in addition to the failure of devices within the managed networks.

Therefore, it would be particularly advantageous to provide a method and system that supports a flexible network management framework in a highly distributed system. It would be particularly advantageous for the network management system to maintain accurate topology information across failover events.

SUMMARY OF THE INVENTION

A method, system, apparatus, and computer program product is presented for management of a distributed data processing system. Resources within the distributed data processing system are dynamically discovered, and the discovered resources are adaptively monitored using the network management framework. When the network management framework detects that certain components within the network management framework may have failed, new instances of these components are started. If duplicate components are later determined to be active concurrently, then a duplicate component is shutdown, thereby ensuring that at least one instance of these components is active at any given time. After certain failover events, a resource rediscovery process may occur, and a topology database containing previously stored information about discovered resources is resynchronized with resource information about rediscovered resources.

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

DETAILED DESCRIPTION OF THE INVENTION

The present invention provides a methodology for managing a distributed data processing system. The manner in which the system management is performed is described further below in more detail after the description of the preferred embodiment of the distributed computing environment in which the present invention operates.

Figure 1:
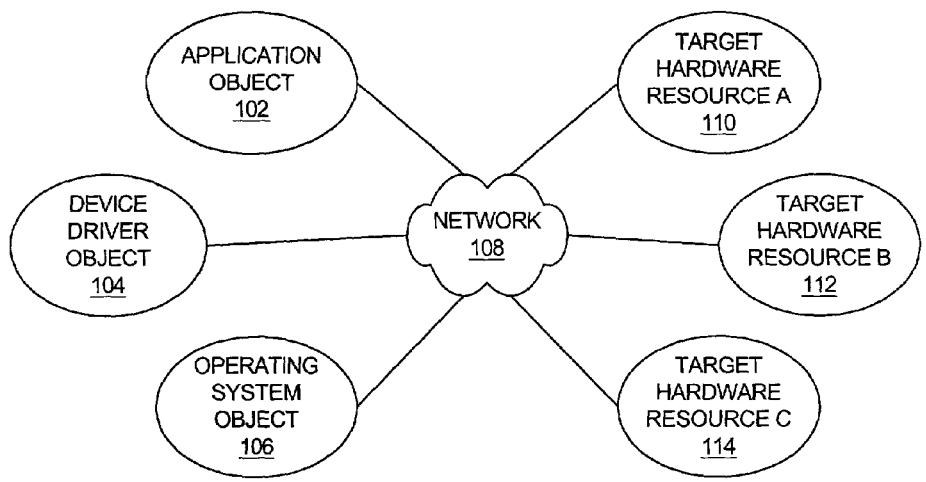
FIG. 1 is a diagram depicting a known logical configuration of software and hardware resources.

With reference now to FIG. 1, a diagram depicts a known logical configuration of software and hardware resources. In this example, the software is organized in an object-oriented system. Application object 102, device driver object 104, and operating system object 106 communicate across network 108 with other objects and with hardware resources 110-114.

In general, the objects require some type of processing, input/output, or storage capability from the hardware resources. The objects may execute on the same device to which the hardware resource is connected, or the objects may be physically dispersed throughout a distributed computing environment. The objects request access to the hardware resource in a variety of manners, e.g. operating system calls to device drivers. Hardware resources are generally available on a first-come, first-serve basis in conjunction with some type of arbitration scheme to ensure that the requests for resources are fairly handled. In some cases, priority may be given to certain requesters, but in most implementations, all requests are eventually processed.

Figure 2A:
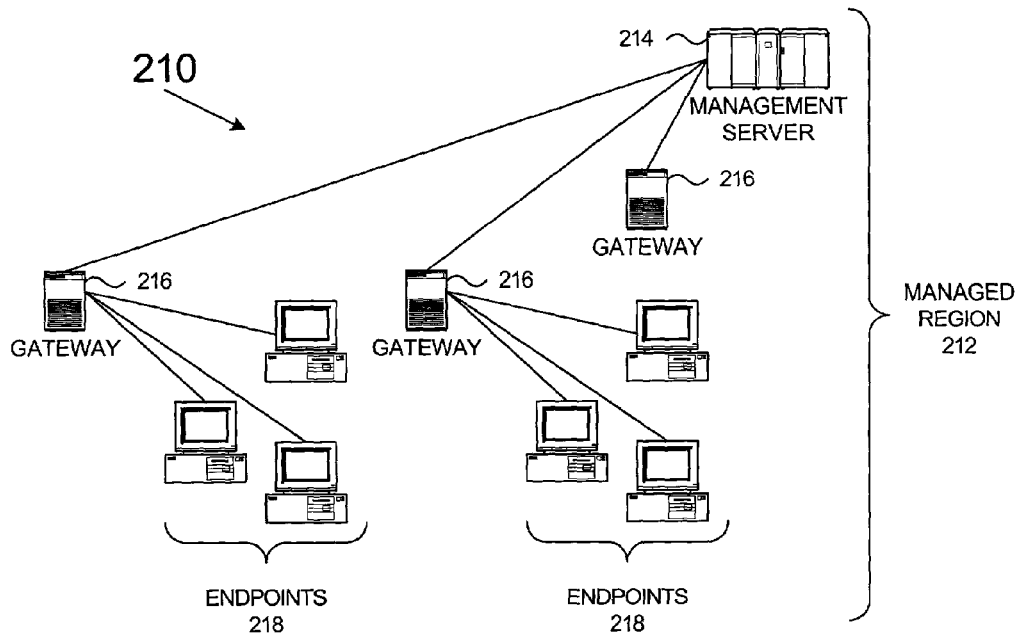
FIG. 2A is simplified diagram illustrating a large distributed computing enterprise environment in which the present invention is implemented.

With reference now to FIG. 2A, the present invention is preferably implemented in a large distributed computer environment 210 comprising up to thousands of "nodes". The nodes will typically be geographically dispersed and the overall environment is "managed" in a distributed manner. Preferably, the managed environment is logically broken down into a series of loosely connected managed regions (MRs) 212, each with its own management server 214 for managing local resources with the managed region. The network typically will include other servers (not shown) for carrying out other distributed network functions. These include name servers, security servers, file servers, thread servers, time servers and the like. Multiple servers 214 coordinate activities across the enterprise and permit remote management and operation. Each server 214 serves a number of gateway machines 216, each of which in turn support a plurality of endpoints/terminal nodes 218. The server 214 coordinates all activity within the managed region using a terminal node manager at server 214.

Figure 2B:
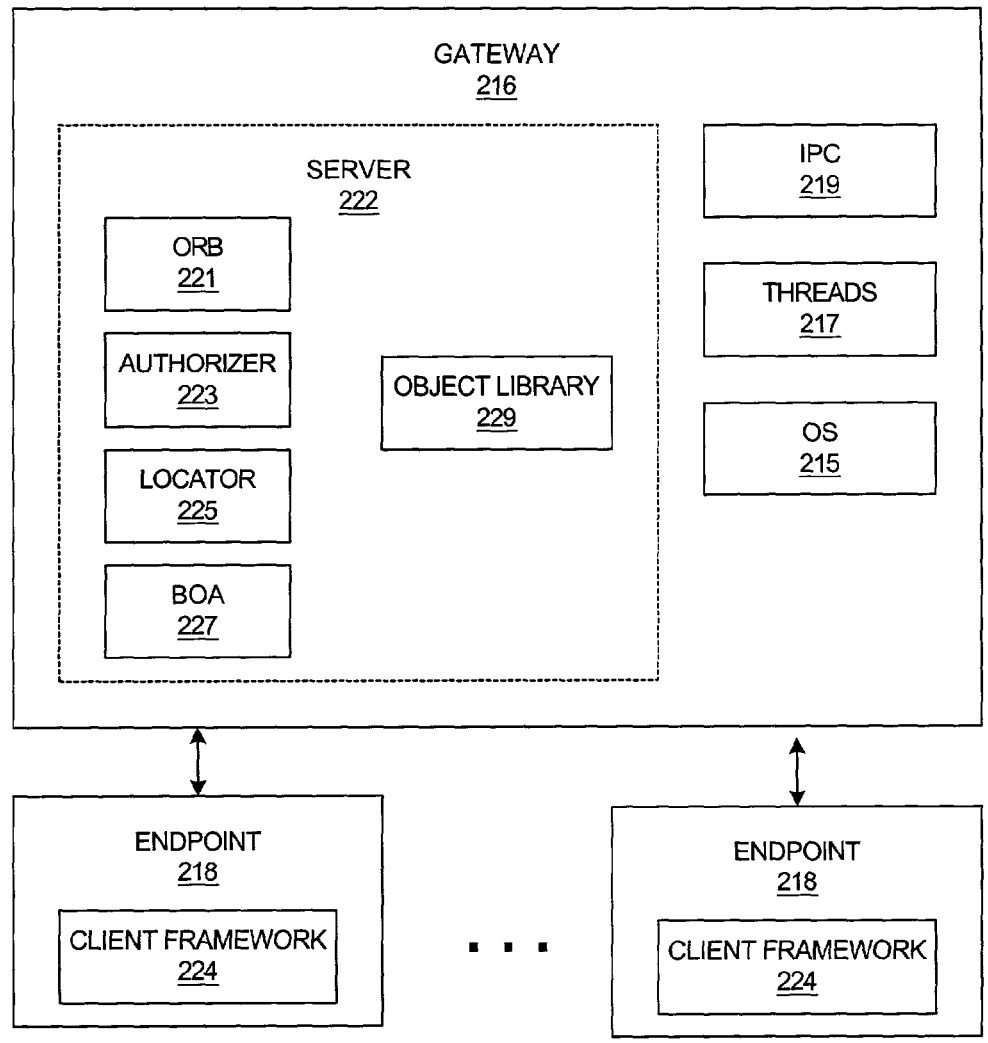
FIG. 2B is a block diagram of a preferred system management framework illustrating how the framework functionality is distributed across the gateway and its endpoints within a managed region.

With reference now to FIG. 2B, each gateway machine 216 runs a server component 222 of a system management framework. The server component 222 is a multi-threaded runtime process that comprises several components: an object request broker (ORB) 221, an authorization service 223, object location service 225 and basic object adapter (BOA) 227. Server component 222 also includes an object library 229. Preferably, ORB 221 runs continuously, separate from the operating system, and it communicates with both server and client processes through separate stubs and skeletons via an interprocess communication (IPC) facility 219. In particular, a secure remote procedure call (RPC) is used to invoke operations on remote objects. Gateway machine 216 also includes operating system 215 and thread mechanism 217.

The system management framework, also termed distributed kernel services (DKS), includes a client component 224 supported on each of the endpoint machines 218. The client component 224 is a low cost, low maintenance application suite that is preferably "dataless" in the sense that system management data is not cached or stored there in a persistent manner. Implementation of the management framework in this "client-server" manner has significant advantages over the prior art, and it facilitates the connectivity of personal computers into the managed environment. It should be noted, however, that an endpoint may also have an ORB for remote object-oriented operations within the distributed environment, as explained in more detail further below.

Using an object-oriented approach, the system management framework facilitates execution of system management tasks required to manage the resources in the managed region. Such tasks are quite varied and include, without limitation, file and data distribution, network usage monitoring, user management, printer or other resource configuration management, and the like. In a preferred implementation, the object-oriented framework includes a Java runtime environment for well-known advantages, such as platform independence and standardized interfaces. Both gateways and endpoints operate portions of the system management tasks through cooperation between the client and server portions of the distributed kernel services.

In a large enterprise, such as the system that is illustrated in FIG. 2A, there is preferably one server per managed region with some number of gateways. For a workgroup-size installation, e.g., a local area network, a single server-class machine may be used as both a server and a gateway. References herein to a distinct server and one or more gateway(s) should thus not be taken by way of limitation as these elements may be combined into a single platform. For intermediate size installations, the managed region grows breadthwise, with additional gateways then being used to balance the load of the endpoints.

The server is the top-level authority over all gateways and endpoints. The server maintains an endpoint list, which keeps track of every endpoint in a managed region. This list preferably contains all information necessary to uniquely identify and manage endpoints including, without limitation, such information as name, location, and machine type. The server also maintains the mapping between endpoints and gateways, and this mapping is preferably dynamic.

As noted above, there are one or more gateways per managed region. Preferably, a gateway is a fully managed node that has been configured to operate as a gateway. In certain circumstances, though, a gateway may be regarded as an endpoint. A gateway always has a network interface card (NIC), so a gateway is also always an endpoint. A gateway usually uses itself as the first seed during a discovery process. Initially, a gateway does not have any information about endpoints. As endpoints login, the gateway builds an endpoint list for its endpoints. The gateway's duties preferably include: listening for endpoint login requests, listening for endpoint update requests, and (its main task) acting as a gateway for method invocations on endpoints.

Figure 2C:
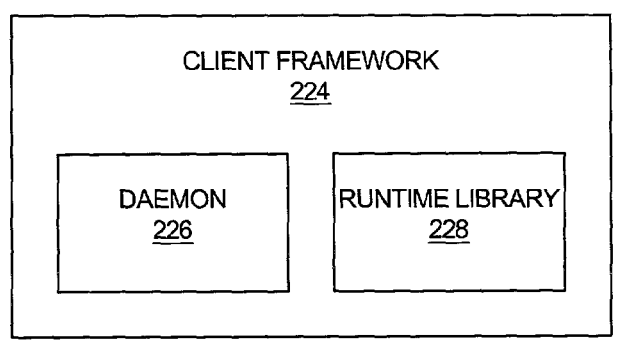
FIG. 2C is a block diagram of the elements that comprise the low cost framework (LCF) client component of the system management framework.

As also discussed above, the endpoint is a machine running the system management framework client component, which is referred to herein as a management agent. The management agent has two main parts as illustrated in FIG. 2C: daemon 226 and application runtime library 228. Daemon 226 is responsible for endpoint login and for spawning application endpoint executables. Once an executable is spawned, daemon 226 has no further interaction with it. Each executable is linked with application runtime library 228, which handles all further communication with the gateway.

Each endpoint is also a computing device. In one preferred embodiment of the invention, most of the endpoints are personal computers, e.g., desktop machines or laptops. In this architecture, the endpoints need not be high powered or complex machines or workstations. An endpoint computer preferably includes a Web browser such as Netscape Navigator or Microsoft Internet Explorer. An endpoint computer thus may be connected to a gateway via the Internet, an intranet, or some other computer network.

Preferably, the client-class framework running on each endpoint is a low-maintenance, low-cost framework that is ready to do management tasks but consumes few machine resources because it is normally in an idle state. Each endpoint may be "dataless" in the sense that system management data is not stored therein before or after a particular system management task is implemented or carried out.

Figure 2D:
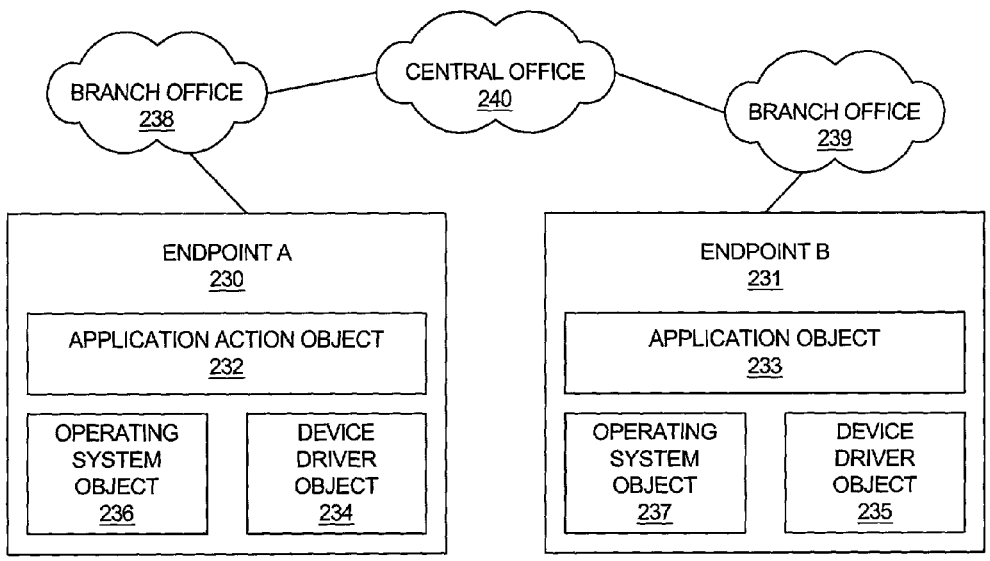
FIG. 2D is a diagram depicting a logical configuration of software objects residing within a hardware network similar to that shown in FIG. 2A.

With reference now to FIG. 2D, a diagram depicts a logical configuration of software objects residing within a hardware network similar to that shown in FIG. 2A. The endpoints in FIG. 2D are similar to the endpoints shown in FIG. 2B. Object-oriented software, similar to the collection of objects shown in FIG. 1, executes on the endpoints. Endpoints 230 and 231 support application action object 232 and application object 233, device driver objects 234-235, and operating system objects 236-237 that communicate across a network with other objects and hardware resources.

Resources can be grouped together by an enterprise into managed regions representing meaningful groups. Overlaid on these regions are domains that divide resources into groups of resources that are managed by gateways. The gateway machines provide access to the resources and also perform routine operations on the resources, such as polling. FIG. 2D shows that endpoints and objects can be grouped into managed regions that represent branch offices 238 and 239 of an enterprise, and certain resources are controlled by central office 240. Neither a branch office nor a central office is necessarily restricted to a single physical location, but each represents some of the hardware resources of the distributed application framework, such as routers, system management servers, endpoints, gateways, and critical applications, such as corporate management Web servers. Different types of gateways can allow access to different types of resources, although a single gateway can serve as a portal to resources of different types.

Figure 2E:
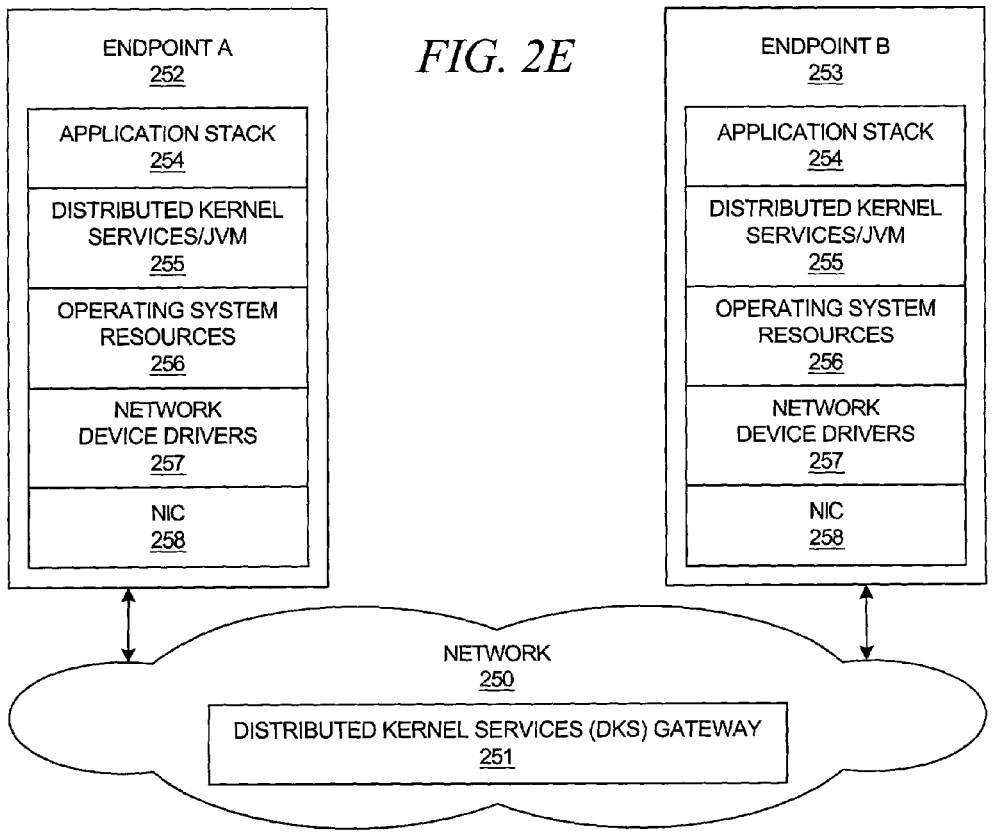
FIG. 2E is a diagram depicting the logical relationships between components within a system management framework that includes two endpoints and a gateway.

With reference now to FIG. 2E, a diagram depicts the logical relationships between components within a system management framework that includes two endpoints and a gateway. FIG. 2E shows more detail of the relationship between components at an endpoint. Network 250 includes gateway 251 and endpoints 252 and 253, which contain similar components, as indicated by the similar reference numerals used in the figure. An endpoint may support a set of applications 254 that use services provided by the distributed kernel services 255, which may rely upon a set of platform-specific operating system resources 256. Operating system resources may include TCP/IP-type resources, SNMP-type resources, and other types of resources. For example, a subset of TCP/IP-type resources may be a line printer (LPR) resource that allows an endpoint to receive print jobs from other endpoints. Applications 254 may also provide self-defined sets of resources that are accessible to other endpoints. Network device drivers 257 send and receive data through NIC hardware 258 to support communication at the endpoint.

Figure 2F:
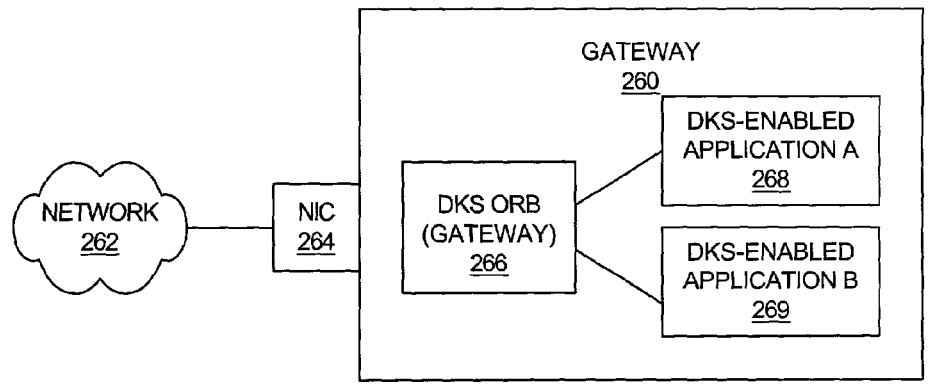
FIG. 2F is a diagram depicting the logical relationships between components within a system management framework that includes a gateway supporting two DKS-enabled applications.

With reference now to FIG. 2F, a diagram depicts the logical relationships between components within a system management framework that includes a gateway supporting two DKS-enabled applications. Gateway 260 communicates with network 262 through NIC 264. Gateway 260 contains ORB 266 that supports DKS-enabled applications 268 and 269. FIG. 2F shows that a gateway can also support applications. In other words, a gateway should not be viewed as merely being a management platform but may also execute other types of applications.

Figure 2G:
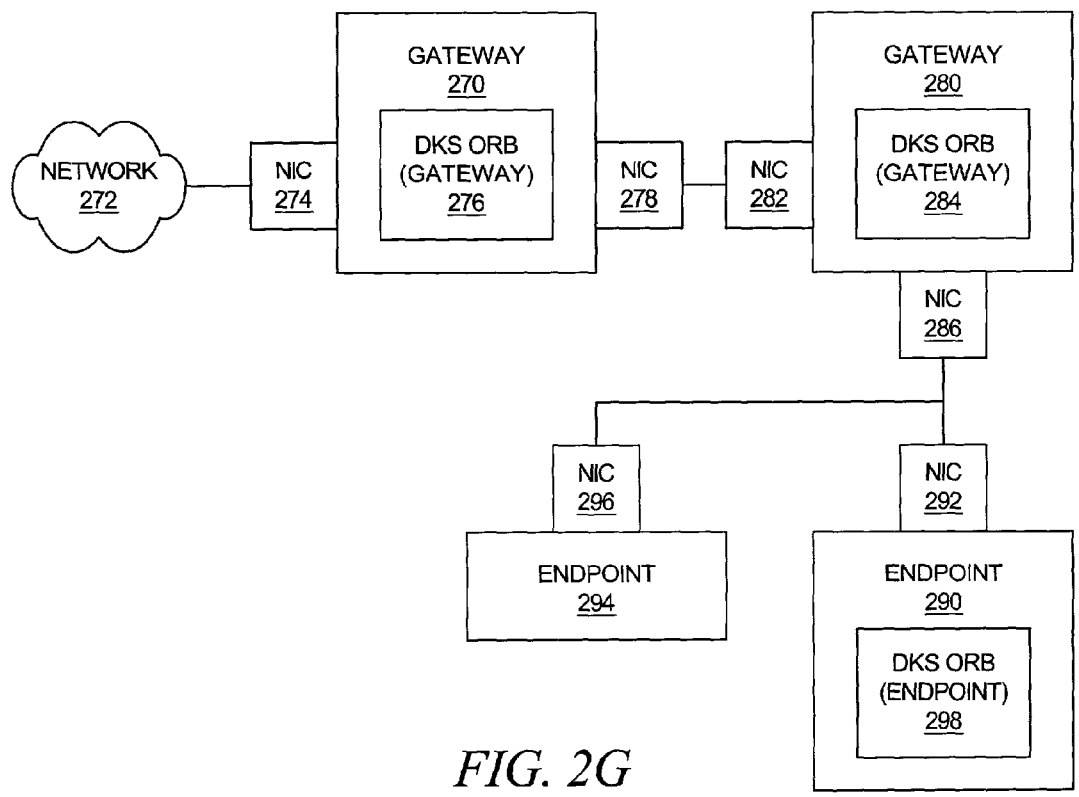
FIG. 2G is a diagram depicting the logical relationships between components within a system management framework that includes two gateways supporting two endpoints.

With reference now to FIG. 2G, a diagram depicts the logical relationships between components within a system management framework that includes two gateways supporting two endpoints. Gateway 270 communicates with network 272 through NIC 274. Gateway 270 contains ORB 276 that may provide a variety of services, as is explained in more detail further below. In this particular example, FIG. 2G shows that a gateway does not necessarily connect with individual endpoints.

Gateway 270 communicates through NIC 278 and network 279 with gateway 280 and its NIC 282. Gateway 280 contains ORB 284 for supporting a set of services. Gateway 280 communicates through NIC 286 and network 287 to endpoint 290 through its NIC 292 and to endpoint 294 through its NIC 296. Endpoint 290 contains ORB 298 while endpoint 294 does not contain an ORB. In this particular example, FIG. 2G also shows that an endpoint does not necessarily contain an ORB. Hence, any use of endpoint 294 as a resource is performed solely through management processes at gateway 280.

FIGS. 2F and 2G also depict the importance of gateways in determining routes/data paths within a highly distributed system for addressing resources within the system and for performing the actual routing of requests for resources. The importance of representing NICs as objects for an object-oriented routing system is described in more detail further below.

As noted previously, the present invention is directed to a methodology for managing a distributed computing environment. A resource is a portion of a computer system's physical units, a portion of a computer system's logical units, or a portion of the computer system's functionality that is identifiable or addressable in some manner to other physical or logical units within the system.

Figure 3:
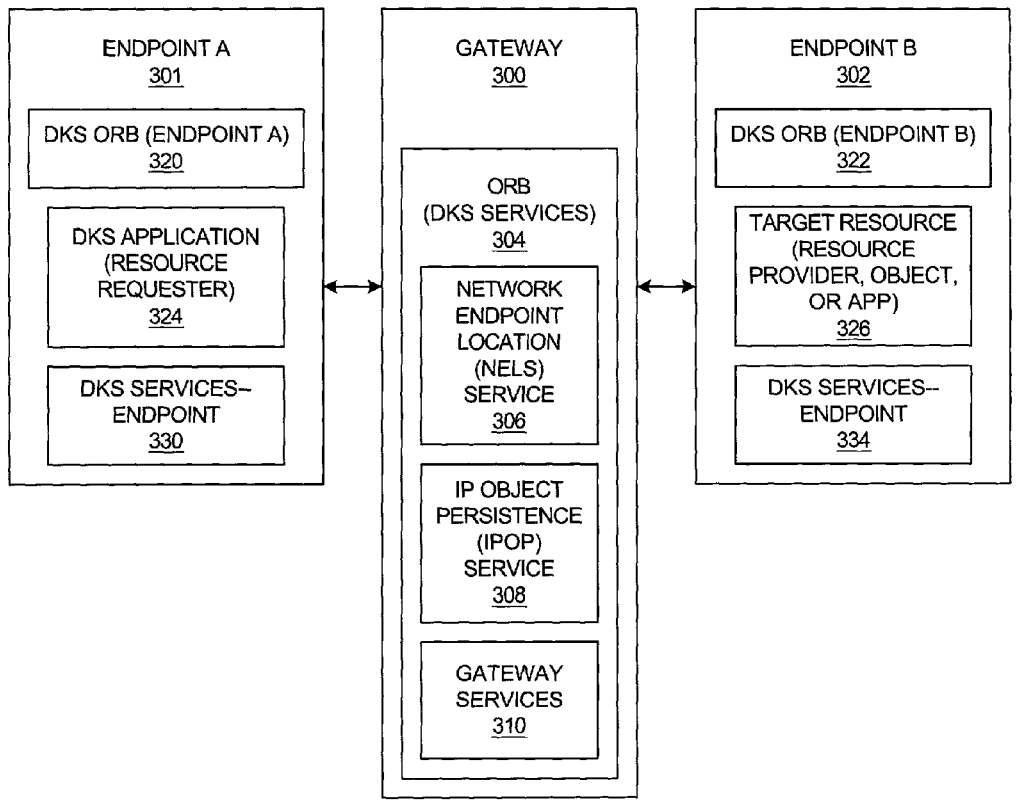
FIG. 3 is a block diagram depicting components within the system management framework that provide resource leasing management functionality within a distributed computing environment such as that shown in FIGS. 2D-2E.

With reference now to FIG. 3, a block diagram depicts components within the system management framework within a distributed computing environment such as that shown in FIGS. 2D-2E. A network contains gateway 300 and endpoints 301 and 302. Gateway 302 runs ORB 304. In general, an ORB can support different services that are configured and run in conjunction with an ORB. In this case, distributed kernel services (DKS) include Network Endpoint Location Service (NELS) 306, IP Object Persistence (IPOP) service 308, and gateway service 310.

The gateway service processes action objects, which are explained in more detail below, and directly communicates with endpoints or agents to perform management operations. The gateway receives events from resources and passes the events to interested parties within the distributed system. The NELS works in combination with action objects and determines which gateway to use to reach a particular resource. A gateway is determined by using the discovery service of the appropriate topology driver, and the gateway location may change due to load balancing or failure of primary gateways.

Other resource level services may include an SNMP (Simple Network Management Protocol) service that provides protocol stacks, polling service, and trap receiver and filtering functions. The SNMP service can be used directly by certain components and applications when higher performance is required or the location independence provided by the gateways and action objects is not desired. A metadata service can also be provided to distribute information concerning the structure of SNMP agents.

The representation of resources within DKS allows for the dynamic management and use of those resources by applications. DKS does not impose any particular representation, but it does provide an object-oriented structure for applications to model resources. The use of object technology allows models to present a unified appearance to management applications and hide the differences among the underlying physical or logical resources. Logical and physical resources can be modeled as separate objects and related to each other using relationship attributes.

By using objects, for example, a system may implement an abstract concept of a router and then use this abstraction within a range of different router hardware. The common portions can be placed into an abstract router class while modeling the important differences in subclasses, including representing a complex system with multiple objects. With an abstracted and encapsulated function, the management applications do not have to handle many details for each managed resource. A router usually has many critical parts, including a routing subsystem, memory buffers, control components, interfaces, and multiple layers of communication protocols. Using multiple objects has the burden of creating multiple object identifiers (OIDs) because each object instance has its own OID. However, a first order object can represent the entire resource and contain references to all of the constituent parts.

Each endpoint may support an object request broker, such as ORBs 320 and 322, for assisting in remote object-oriented operations within the DKS environment. Endpoint 301 contains DKS-enabled application 324 that utilizes object-oriented resources found within the distributed computing environment. Endpoint 302 contains target resource provider object or application 326 that services the requests from DKS-enabled application 324. A set of DKS services 330 and 334 support each particular endpoint.

Applications require some type of insulation from the specifics of the operations of gateways. In the DKS environment, applications create action objects that encapsulate commands which are sent to gateways, and the applications wait for the return of the action object. Action objects contain all of the information necessary to run a command on a resource. The application does not need to know the specific protocol that is used to communicate with the resource. The application is unaware of the location of the gateway because it issues an action object into the system, and the action object itself locates and moves to the correct gateway. The location independence allows the NELS to balance the load between gateways independently of the applications and also allows the gateways to handle resources or endpoints that move or need to be serviced by another gateway.

The communication between a gateway and an action object is asynchronous, and the action objects provide error handling and recovery. If one gateway goes down or becomes overloaded, another gateway is located for executing the action object, and communication is established again with the application from the new gateway. Once the controlling gateway of the selected endpoint has been identified, the action object will transport itself there for further processing of the command or data contained in the action object. If it is within the same ORB, it is a direct transport. If it is within another ORB, then the transport can be accomplished with a "Moveto" command or as a parameter on a method call.

Queuing the action object on the gateway results in a controlled process for the sending and receiving of data from the IP devices. As a general rule, the queued action objects are executed in the order that they arrive at the gateway. The action object may create child action objects if the collection of endpoints contains more than a single ORB ID or gateway ID. The parent action object is responsible for coordinating the completion status of any of its children. The creation of child action objects is transparent to the calling application. A gateway processes incoming action objects, assigns a priority, and performs additional security challenges to prevent rogue action object attacks. The action object is delivered to the gateway that must convert the information in the action object to a form suitable for the agent. The gateway manages multiple concurrent action objects targeted at one or more agents, returning the results of the operation to the calling application as appropriate.

In the preferred embodiment, potentially leasable target resources are Internet protocol (IP) commands, e.g. pings, and Simple Network Management Protocol (SNMP) commands that can be executed against endpoints in a managed region. Referring again to FIGS. 2F and 2G, each NIC at a gateway or an endpoint may be used to address an action object. Each NIC is represented as an object within the IPOP database, which is described in more detail further below.

The Action Object IP (AOIP) Class is a subclass of the Action Object Class. An AOIP object is the primary vehicle that establishes a connection between an application and a designated IP endpoint using a gateway or stand-alone service. In addition, the Action Object SNMP (AOSnmp) Class is also a subclass of the Action Object Class. An AOSnmp object is the primary vehicle that establishes a connection between an application and a designated SNMP endpoint via a gateway or the Gateway Service. However, the present invention is primarily concerned with IP endpoints.

The AOIP class should include the following: a constructor to initialize itself; an interface to the NELS; a mechanism by which the action object can use the ORB to transport itself to the selected gateway; a security check verification of access rights to endpoints; a container for either data or commands to be executed at the gateway; a mechanism by which to pass commands or classes to the appropriate gateway or endpoint for completion; and public methods to facilitate the communication between objects.

The instantiation of an AOIP object creates a logical circuit between an application and the targeted gateway or endpoint. This circuit is persistent until command completion through normal operation or until an exception is thrown. When created, the AOIP object instantiates itself as an object and initializes any internal variables required. An AOIP may be capable of running a command from inception or waiting for a future command. A program that creates an AOIP object must supply the following elements: address of endpoints; function to be performed on the endpoint; and data arguments specific to the command to be run. A small part of the action object must contain the return end path for the object. This may identify how to communicate with the action object in case of a breakdown in normal network communications. An action object can contain either a class or object containing program information or data to be delivered eventually to an endpoint or a set of commands to be performed at the appropriate gateway. Action objects IP return back a result for each address endpoint targeted.

Using commands such as "Ping", "Trace Route", "Wake-On LAN", and "Discovery", the AOIP object performs the following services: facilitates the accumulation of metrics for the user connections; assists in the description of the topology of a connection; performs Wake-On LAN tasks using helper functions; and discovers active agents in the network environment.

The NELS service finds a route to communicate between the application and the appropriate endpoint. The NELS service converts input to protocol, network address, and gateway location for use by action objects. The NELS service is a thin service that supplies information discovered by the IPOP service. The primary roles of the NELS service are as follows: support the requests of applications for routes; maintain the gateway and endpoint caches that keep the route information; ensure the security of the requests; and perform the requests as efficiently as possible to enhance performance.

For example, an application requires a target endpoint (target resource) to be located. The target is ultimately known within the DKS space using traditional network values, i.e. a specific network address and a specific protocol identifier. An action object is generated on behalf of an application to resolve the network location of an endpoint. The action object asks the NELS service to resolve the network address and define the route to the endpoint in that network.

One of the following is passed to the action object to specify a destination endpoint: an EndpointAddress object; a fully decoded NetworkAddress object; or a string representing the IP address of the IP endpoint. In combination with the action objects, the NELS service determines which gateway to use to reach a particular resource. The appropriate gateway is determined using the discovery service of the appropriate topology driver and may change due to load balancing or failure of primary gateways. An "EndpointAddress" object must consist of a collection of at least one or more unique managed resource IDs. A managed resource ID decouples the protocol selection process from the application and allows the NELS service to have the flexibility to decide the best protocol to reach an endpoint. On return from the NELS service, an "AddressEndpoint" object is returned, which contains enough information to target the best place to communicate with the selected IP endpoints. It should be noted that the address may include protocol-dependent addresses as well as protocol-independent addresses, such as the virtual private network id and the IPOP Object ID. These additional addresses handle the case where duplicate addresses exist in the managed region.

When an action needs to be taken on a set of endpoints, the NELS service determines which endpoints are managed by which gateways. When the appropriate gateways are identified, a single copy of the action object is distributed to each identified gateway. The results from the endpoints are asynchronously merged back to the caller application through the appropriate gateways. Performing the actions asynchronously allows for tracking all results whether the endpoints are connected or disconnected. If the AOIP fails to execute on its target gateway, NELS is consulted to identify an alternative path for the command. If an alternate path is found, the action object IP is transported to that gateway and executed. It may be assumed that the entire set of commands within one action object IP must fail before this recovery procedure is invoked.

Figure 4:
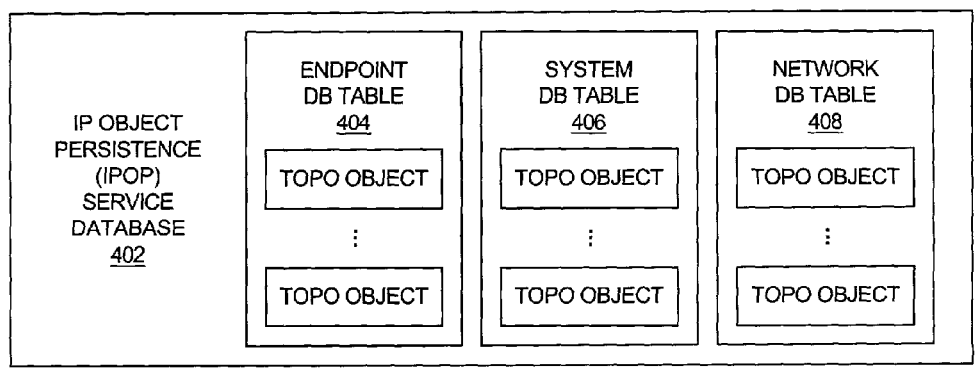
FIG. 4 is a block diagram showing data stored by a the IPOP (IP Object Persistence) service.

With reference now to FIG. 4, a block diagram shows the manner in which data is stored by the IPOP (IP Object Persistence) service. IPOP service database 402 contains endpoint database table 404, system database table 406, and network database table 408. Each table contains a set of topological objects (TopoObjects) for facilitating the leasing of resources at IP endpoints and the execution of action objects. Information within IPOP service database 402 allows applications to generate action objects for resources previously identified as IP objects through a discovery process across the distributed computing environment. FIG. 4 merely shows that the TopoObjects may be separated into a variety of categories that facilitate processing on the various objects. The separation of physical network categories facilitates the efficient querying and storage of these objects while maintaining the physical network relationships in order to produce a graphical user interface of the network topology.

Figure 5A:
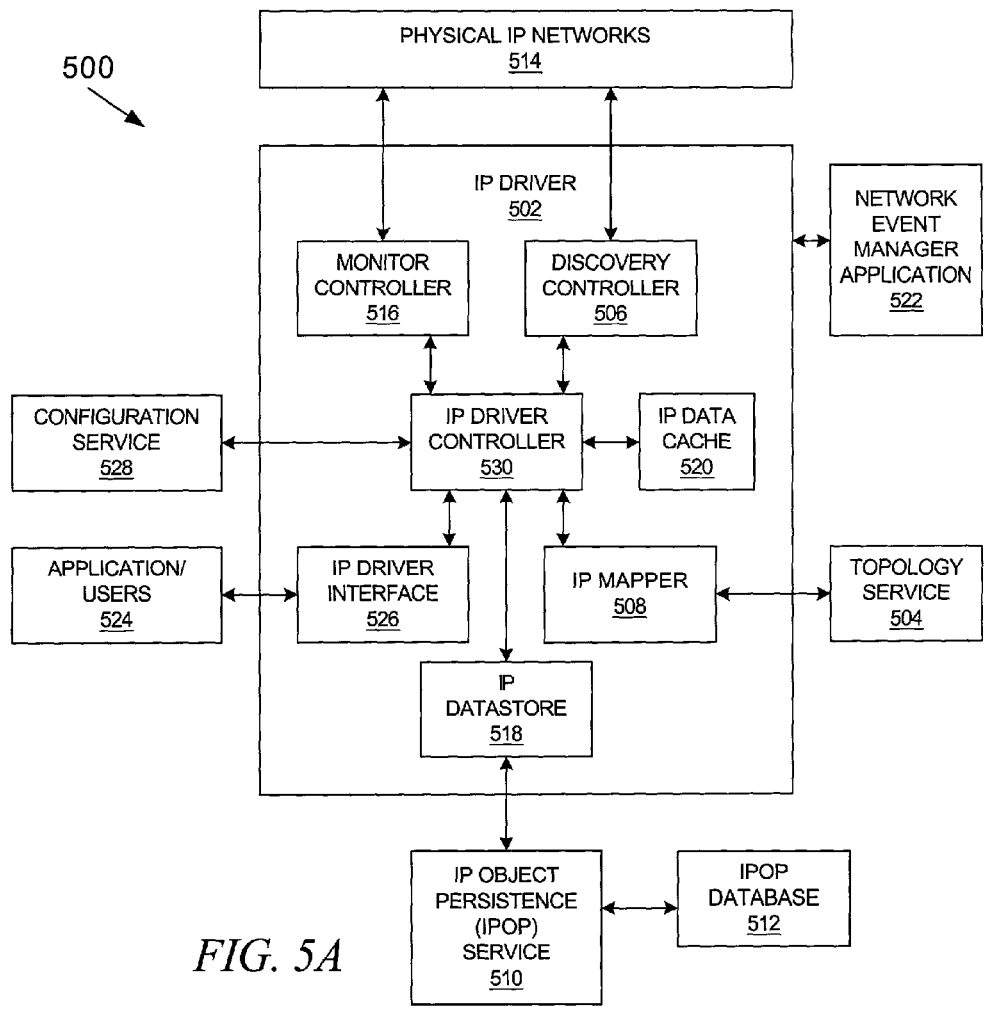
FIG. 5A is a block diagram showing the IPOP service in more detail.

With reference now to FIG. 5A, a block diagram shows the IPOP service in more detail. In the preferred embodiment of the present invention, an IP driver subsystem is implemented as a collection of software components for discovering, i.e. detecting, IP "objects", i.e. IP networks, IP systems, and IP endpoints by using physical network connections. This discovered physical network is used to create topology data that is then provided through other services via topology maps accessible through a graphical user interface (GUI) or for the manipulation of other applications. The IP driver system can also monitor objects for changes in IP topology and update databases with the new topology information. The IPOP service provides services for other applications to access the IP object database.

IP driver subsystem 500 contains a conglomeration of components, including one or more IP drivers 502. Every IP driver manages its own "scope", which is described in more detail further below, and every IP driver is assigned to a topology manager within topology service 504, which can serve more than one IP driver. Topology service 504 stores topology information obtained from discovery controller 506. The information stored within the topology service may include graphs, arcs, and the relationships between nodes determined by IP mapper 508. Users can be provided with a GUI to navigate the topology, which can be stored within a database within the topology service.

IPOP service 510 provides a persistent repository 512 for discovered IP objects; persistent repository 512 contains attributes of IP objects without presentation information. Discovery controller 506 detects IP objects in physical IP networks 514, and monitor controller 516 monitors IP objects. A persistent repository, such as IPOP database 512, is updated to contain information about the discovered and monitored IP objects. IP driver may use temporary IP data store component 518 and IP data cache component 520 as necessary for caching IP objects or storing IP objects in persistent repository 512, respectively. As discovery controller 506 and monitor controller 516 perform detection and monitoring functions, events can be written to network event manager application 522 to alert network administrators of certain occurrences within the network, such as the discovery of duplicate IP addresses or invalid network masks.

External applications/users 524 can be other users, such as network administrators at management consoles, or applications that use IP driver GUI interface 526 to configure IP driver 502, manage/unmanage IP objects, and manipulate objects in persistent repository 512. Configuration service 528 provides configuration information to IP driver 502. IP driver controller 530 serves as central control of all other IP driver components.

Referring back to FIG. 2G, a network discovery engine is a distributed collection of IP drivers that are used to ensure that operations on IP objects by gateways 260, 270, and 280 can scale to a large installation and provide fault-tolerant operation with dynamic start/stop or reconfiguration of each IP driver. The IPOP service stores and retrieves information about discovered IP objects; to do so, the IPOP service uses a distributed database in order to efficiently service query requests by a gateway to determine routing, identity, or a variety of details about an endpoint. The IPOP service also services queries by the topology service in order to display a physical network or map them to a logical network, which is a subset of a physical network that is defined programmatically or by an administrator. IPOP fault tolerance is also achieved by distribution of IPOP data and the IPOP service among many endpoint ORBs.

One or more IP drivers can be deployed to provide distribution of IP discovery and promote scalability of IP driver subsystem services in large networks where a single IP driver is not sufficient to discover and monitor all IP objects. Each IP driver performs discovery and monitoring on a collection of IP resources within the driver's "scope". A driver's scope, which is explained in more detail below, is simply the set of IP subnets for which the driver is responsible for discovering and monitoring. Network administrators generally partition their networks into as many scopes as needed to provide distributed discovery and satisfactory performance.

A potential risk exists if the scope of one driver overlaps the scope of another, i.e. if two drivers attempt to discover/monitor the same device. Accurately defining unique and independent scopes may require the development of a scope configuration tool to verify the uniqueness of scope definitions. Routers also pose a potential problem in that while the networks serviced by the routers will be in different scopes, a convention needs to be established to specify to which network the router "belongs", thereby limiting the router itself to the scope of a single driver.

Some ISPs may have to manage private networks whose addresses may not be unique across the installation, like 10.0.0.0 network. In order to manage private networks properly, first, the IP driver has to be installed inside the internal networks in order to be able to discover and manage the networks. Second, since the discovered IP addresses may not be unique across an entire installation that consists of multiple regions, multiple customers, etc., a private network ID has to be assigned to the private network addresses. In the preferred embodiment, the unique name of a subnet becomes "privateNetworkId\subnetAddress". Those customers that do not have duplicate networks address can just ignore the private network ID; the default private network ID is 0.

If Network Address Translator (NAT) is installed to translate the internal IP addresses to Internet IP addresses, users can install the IP drivers outside of NAT and manage the IP addresses inside the NAT. In this case, an IP driver will see only the translated IP addresses and discover only the IP addresses translated. If not all IP addresses inside the NAT are translated, an IP driver will not able to discover all of them. However, if IP drivers are installed this way, users do not have to configure the private network within the IP driver's scope.

Scope configuration is important to the proper operation of the IP drivers because IP drivers assume that there are no overlaps in the drivers' scopes. Since there should be no overlaps, every IP driver has complete control over the objects within its scope. A particular IP driver does not need to know anything about the other IP drivers because there is no synchronization of information between IP drivers. The configuration service provides the means to allow the DKS components to store and retrieve configuration information for a variety of other services from anywhere in the networks.

In particular, the scope configuration will be stored in the configuration service so that IP drivers and other applications can access the information.

The ranges of addresses that a driver will discover and monitor are determined by associating a subnet address with a subnet mask and associating the resulting range of addresses with a subnet priority. An IP driver is a collection of such ranges of addresses, and the subnet priority is used to help decide the system address. A system can belong to two or more subnets, such as is commonly seen with a gateway. The system address is the address of one of the NICs that is used to make SNMP queries. A user interface can be provided, such as an administrator console, to write scope information into the configuration service. System administrators do not need to provide this information at all, however, as the IP drivers can use default values.

An IP driver gets its scope configuration information from the configuration service, which may be stored using the following format:
scopeID=driverID,anchorname,subnetAddress:subnetMask[:privateNetworkId:privateNetworkName:subnetPriority][,subnetAddress:subnetMask:privateNetworkId:privateNetworkName:subnetPriority]]

Typically, one IP driver manages only one scope. Hence, the "scopeID" and "driverID" would be the same. However, the configuration can provide for more than one scope managed by the same driver. "Anchorname" is the name in the name space in which the topology service will put the IP driver's network objects.

A scope does not have to include an actual subnet configured in the network. Instead, users/administrators can group subnets into a single, logical scope by applying a bigger subnet mask to the network address. For example, if a system has subnet "147.0.0.0" with mask of "255.255.0.0" and subnet "147.1.0.0" with a subnet mask of "255.255.0.0", the subnets can be grouped into a single scope by applying a mask of "255.254.0.0". Assume that the following table is the scope of IP Driver 2. The scope configuration for IP Driver 2 from the configuration service would be: 2=2,ip,147.0.0.0:255.254.0.0,146.100.0.0:255.255.0.0, 69.0.0.0:255.0.0.0.

| Subnet address | Subnet mask |
|---|---|
| 147.0.0.0 | 255.255.0.0 |
| 147.1.0.0 | 255.255.0.0 |
| 146.100.0.0 | 255.255.0.0 |
| 69.0.0.0 | 255.0.0.0 |

In general, an IP system is associated with a single IP address, and the "scoping" process is a straightforward association of a driver's ID with the system's IP address.

Routers and multi-homed systems, however, complicate the discovery and monitoring process because these devices may contain interfaces that are associated with different subnets. If all subnets of routers and multi-homed systems are in the scope of the same driver, the IP driver will manage the whole system. However, if the subnets of routers and multi-homed systems are across the scopes of different drivers, a convention is needed to determine a dominant interface: the IP driver that manages the dominant interface will manage the router object so that the router is not being detected and monitored by multiple drivers; each interface is still managed by the IP driver determined by its scope; the IP address of the dominant interface will be assigned as the system address of the router or multi-homed system; and the smallest (lowest) IP address of any interface on the router will determine which driver includes the router object within its scope.

Users can customize the configuration by using the subnet priority in the scope configuration. The subnet priority will be used to determinate the dominant interface before using the lowest IP address. If the subnet priorities are the same, the lowest IP address is then used. Since the default subnet priority would be "0", then the lowest IP address would be used by default.

Figure 5B:
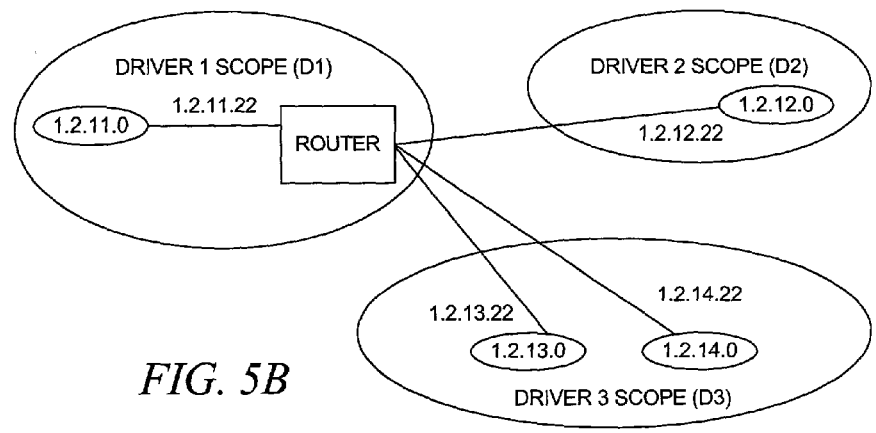
FIG. 5B is a network diagram depicting a set of routers that undergo a scoping process.

With reference now to FIG. 5B, a network diagram depicts a network with a router that undergoes a scoping process. IP driver D1 will include the router in its scope because the subnet associated with that router interface is lower than the other three subnet addresses. However, each driver will still manage those interfaces inside the router in its scope. Drivers D2 and D3 will monitor the devices within their respective subnets, but only driver D1 will store information about the router itself in the IPOP database and the topology service database.

If driver D1's entire subnet is removed from the router, driver D2 will become the new "owner" of the router object because the subnet address associated with driver D2 is now the lowest address on the router. Because there is no synchronization of information between the drivers, the drivers will self-correct over time as they periodically rediscover their resources. When the old driver discovers that it no longer owns the router, it deletes the router's information from the databases. When the new driver discovers the router's lowest subnet address is now within its scope, the new driver takes ownership of the router and updates the various databases with the router's information. If the new driver discovers the change before the old driver has deleted the object, then the router object may be briefly represented twice until the old owner deletes the original representation.

There are two kinds of associations between IP objects. One is "IP endpoint in IP system" and the other is "IP endpoint in IP network". The implementation of associations relies on the fact that an IP endpoint has the object IDs (OIDs) of the IP system and the IP network in which it is located. An IP driver can partition all IP networks, IP Systems, and IP endpoints into different scopes. A network and all its IP endpoints will always be assigned in the same scope. However, a router may be assigned to an IP driver, but some of its interfaces are assigned to different IP drivers. The IP drivers that do not manage the router but manage some of its interfaces will have to create interfaces but not the router object. Since those IP drivers do not have a router object ID to assign to its managed interfaces, they will assign a unique system name instead of object ID in the IP endpoint object to provide a link to the system object in a different driver.

Because of the inter-scope association, when the IP Object Persistence service (IPOP) is queried to find all the IP endpoints in system, it will have to search not only IP endpoints with the proper system ID but also IP endpoints with its system name. If a distributed IP Object Persistence service is implemented, the service has to provide extra information for searching among its distributed instances.

As described above, an IP driver subsystem is implemented as a collection of software components for discovering, i.e. detecting, network "objects", such as IP networks, IP systems, and IP endpoints by using physical network connections. The collected data is then provided through other services via topology maps accessible through a GUI or for the manipulation of other applications. The IP driver system can also monitor objects for changes in IP topology and update databases with the new topology information. The IPOP service provides services for other applications to access the IP object database.

Referring again to FIG. 5A, IP driver subsystem 500 contains a conglomeration of components, including one or more IP drivers 502. Every IP driver manages its own "scope", and every IP driver is assigned to a topology manager within topology service 504, which stores topology information obtained from discovery controller 506. The information stored within the topology service may include graphs, arcs, and the relationships between nodes determined by IP mapper 508. Users can be provided with a GUI to navigate the topology, which can be stored within a database within the topology service.

The topology service provides a framework for DKS-enabled applications to manage topology data. In a manner similar to the IPOP service, the topology service is actually a cluster of topology servers distributed throughout the network. All of the functions of the topology service are replicated in each topology server. Therefore, a client can attach to any server instance and perform the same tasks and access the same objects. Each topology-related database is accessible from more than one topology server, which enables the topology service to recover from a server crash and provide a way to balance the load on the service.

Topology clients create an instance of a TopoClientService class. As part of creating the TopoClientService instance, the class connects to one of the topology servers. The topology server assumes the burden of consolidating all of the topology information distributed over the different topology servers into a single combined view. The topology service tracks changes in the objects of interest for each client and notifies a client if any of the objects change.

The topology service may have a server-cluster design for maximizing availability. As long as there is at least one instance of the topology server running, then clients have access to topology objects and services. The topology service design allows for servers to occasionally fail. Each server is aware of the state of all the other server instances. If one instance fails, the other servers know immediately and automatically begin to rebuild state information that was lost by the failed server. A client's TopoClientService instance also knows of the failure of the server to which it is connected and re-connects to a different server. The objects residing at a failed topology server are migrated to the other topology servers when the drivers owning those objects have re-located.

The topology service is scalable, which is important so that the service may be the central place for all network topology objects for all of the different DKS-related applications in order to provide efficient service for millions of objects. As the number of clients, drivers, and objects increase, an administrator can create more instances of topology servers, thereby balancing the workload. Using the server cluster approach, any growth in the number of clients, drivers, and objects is accommodated by simply adding more servers. The existing servers detect the additional instances and begin to move clients and drivers over to the new instances. The automated load-balancing is achieved because the clients and objects are not dependent on any one server instance.

In order to provide a service for an entire enterprise, all of the enterprise's objects generally do not reside in the same database. There may be many reasons that make it undesirable to require that all topology objects be stored in the same database instance. For example, a database simply may not be reachable across an international boundary, or the volume of information going into the database may exceed a single database's capacity. Therefore, the topology objects may span databases, and there may be relationships between objects in different databases. However, it may be assumed that all topology objects in a domain reside in the same database. For example, all IP objects for a single enterprise do not necessarily reside in the same database as the enterprise's IP space may be split into many domains, e.g., a southwest IP domain and a northeast IP domain, but each domain may reside in different databases and still have relations between their objects. Hence, it is possible to have two objects related to each other even though they are in different databases. Since the name of the domain is part of the id of the object, each object can be uniquely identified within the entire topology service.

When an application is installed and configured to use the DKS services, the application provides some information to the topology service about the different types of TopoObjects it will be creating. This class information closely resembles the network entities that a driver will be managing. For example, an IP application works with Network, System, and Endpoint resource types, as described previously with respect to FIG. 4. Giving TopoObjects a resource type enables client applications to identify, group, and query the databases based on domain-specific types. Each resource type may have many different types of relations that the driver may create, and the most common type may be the containment relation, which shows the containment hierarchy of a domain. Each relation type has a corresponding ViewData object, which provides information that an administrative console needs to create a view of the TopoObjects. For example, the ViewData object may contain members like BackgroundColor and LayoutType that are used to construct a graphical display of the object. Relations can be created between any two TopoObjects. The TopoObjects can be owned by the same driver, different drivers in the domain, or even drivers in different domains.

Figure 6A:
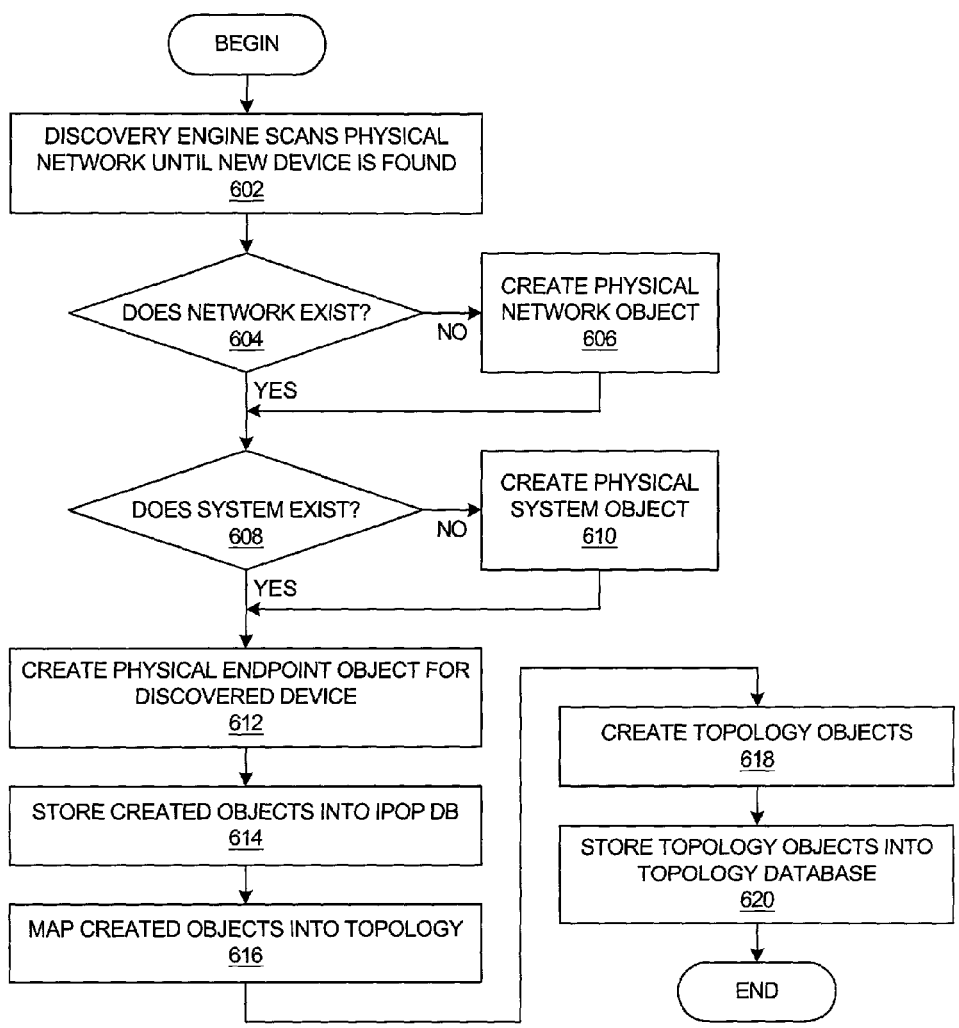
FIG. 6A is a flowchart depicting a process for creating topology data.

With reference now to FIG. 6A, a flowchart depicts a process for creating topology data. The process begins when one or more discovery engines scan physical networks until a new device is found (step 602). A determination is made as to whether or not a network object exists for the network in which the endpoint has been found (step 604). If not, then a network object is created (step 606), otherwise the process continues.

In either case, a determination is then made as to whether or not a system object exists for the system in which the endpoint has been found (step 608). If not, then a system object is created (step 610), otherwise the process continues. In either case, an endpoint object is then created for the discovered device (step 612), and all of the created objects are then stored within the IPOP database (step 614). The created objects are then mapped into the current topology (step 616), and the topology service creates topology objects (step 618) and stores them within the topology database (step 620). The process of discovering a physical network or device and storing appropriate information is then complete.

Figure 6B:
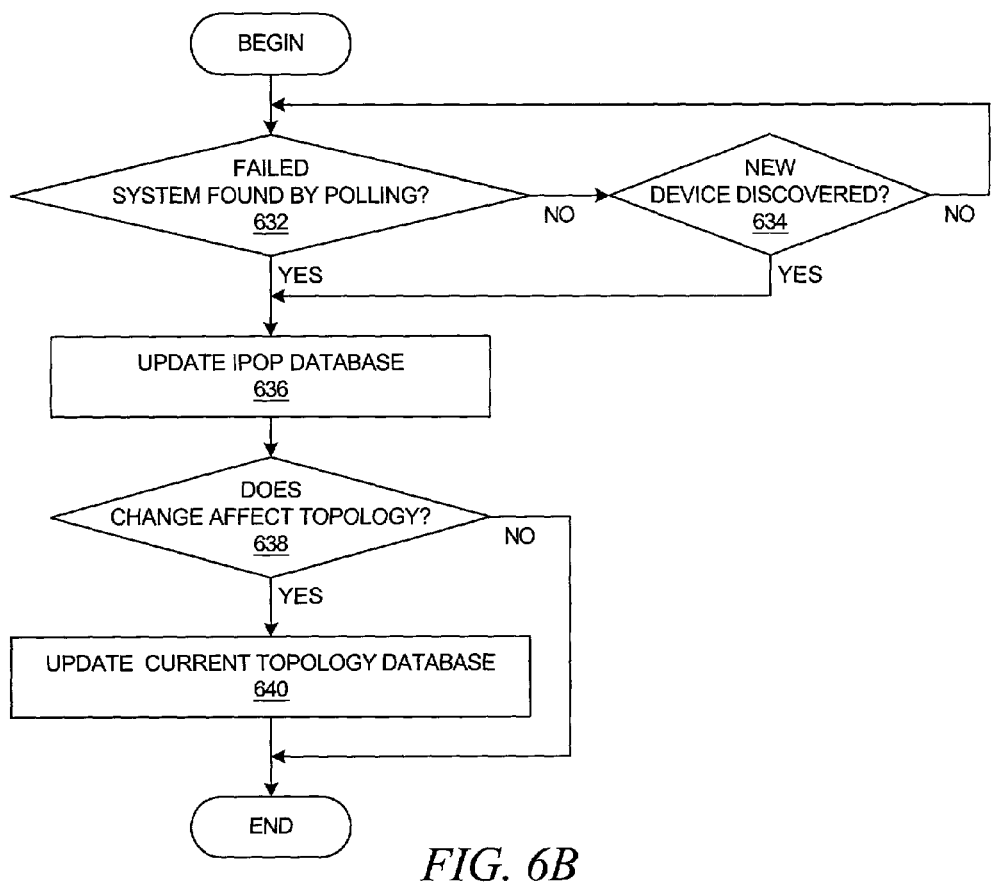
FIG. 6B is a flowchart depicting a process for listening for physical network changes that affect topology objects.

With reference now to FIG. 6B, a flowchart depicts a process for listening for physical network changes that affect topology objects. The process begins with a determination of whether or not one or more polling engines has found a system or device that has failed (step 632). If not, then a determination is made as to whether or not a new device has been discovered (step 634). If not, then the process loops back to continue monitoring the networks.

If either a new device is discovered or a device has failed, then the appropriate changes are made to the objects representing the physical devices that have been affected by updating the IPOP database (step 636). For example, if a new device is found, then appropriate steps are made to create the necessary objects in a manner similar to steps 604-620 in FIG. 6A. A determination is then made as to whether or not the detected change affects the topology (step 638), and if not, then the process is complete. If the topology has been affected, then the topology database is updated as necessary (step 640), and the process of listening for network changes and reflecting those changes within the topology is complete.

Figure 7A:
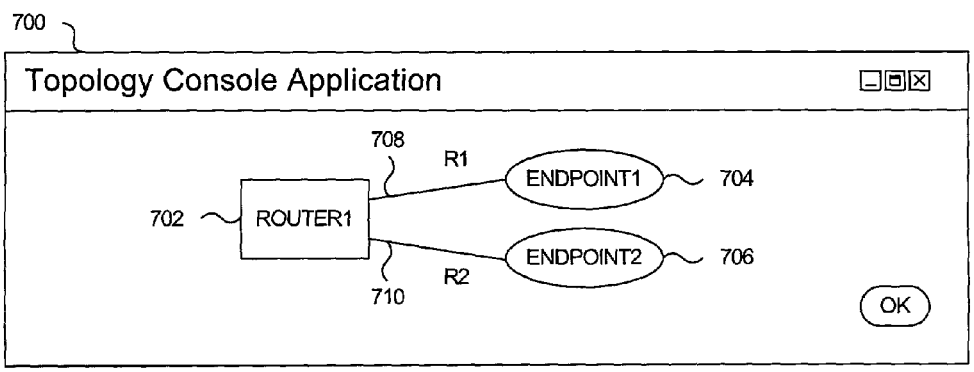
FIG. 7A is a figure depicting a graphical user interface window that may be used by a network or system administrator to view the topology of a network that is being monitored.

With reference now to FIG. 7A, a figure depicts a graphical user interface window that may be used by a network or system administrator to view the topology of a network that is being monitored. Window 700 depicts a simple network showing router device 702, endpoint 704, and endpoint 706. In addition, line 708 shows a relation between endpoint 704 and router 702, and line 710 shows a relation between endpoint 706 and router 702. Each of the icons 702-706 represents a TopoObject that is maintained by the topology service.

Figure 7B:
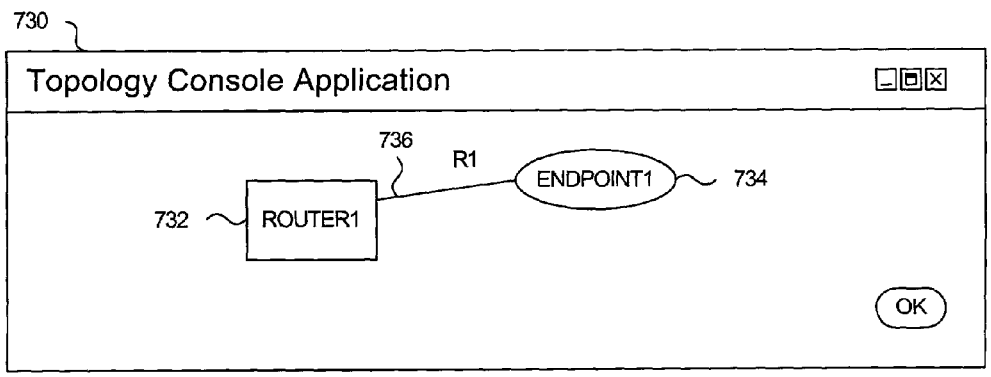
FIG. 7B is a graphical user interface window that shows the topology of a network that has changed.

With reference now to FIG. 7B, a figure depicts a graphical user interface window that shows the topology of a network that has changed. Window 730 in FIG. 7B shows the same network as depicted within window 700 of FIG. 7A except that an endpoint has failed and has been deleted from the current topology. Window 730 depicts a simple network showing router device 732, endpoint 734, and line 736 for the relation between endpoint 734 and router 732.

As mentioned previously, although a corporate network or a department-level local area network may be relatively stable with a relatively unchanging topology, a very large network may undergo constant change as devices within the network fail and/or automatically reconfigure, thereby resulting in frequent changes to the topology of the network. FIG. 6B shows a process in which the failure of a monitored device is detected and the topology database is updated, and FIG. 7B shows a simple topology map that reflects the change.

In addition to device failures, another type of failure event is a failure within a network management framework component, such as an IP driver that is being used to perform the monitoring operations on a set of endpoints. A network management framework component may fail for various reasons, such as a hardware failure of the system on which the network management framework component is executing or a software failure of the operating system or other software component on which the network management framework component is supported.

As described above, the DKS network management framework is composed of a set of services that are supported by an ORB infrastructure. The network management framework may include a failover service that monitors other services for different types of failures and restarts those services.

In the present invention, the network management framework relies on the operation of certain unique network management framework components. After an instance of a unique network management framework component is detected to have possibly failed, another instance of the network management framework component may be restarted by a failover service.

In other words, rather than attempting to definitively determine whether or not the unique network management framework component has failed, another instance of the network management framework component is started as soon as a determination is made that the network management framework component may have failed. In addition, an instance of the network management framework component may be restarted as part of an overall device restart process.

In this manner, the present invention provides a methodology in which an attempt is made to ensure that at least one instance of a unique network management framework component is operating at any given time, thereby asserting a failover methodology that may result in the duplication of unique network management framework components. However, since only one instance of a unique network management framework component should be operating at any given time, the network management framework also detects whether duplicate network management framework components are operating at any given time as a type of self-correction procedure. If duplicate network management framework components are detected, then one of the duplicate network management framework components is shutdown, thereby self-correcting the aggressive failover procedure that resulted in the operation of more than one instance of a unique network management framework component.

The operation of an IP driver within the DKS system was partially described above. With respect to the present invention, each IP driver in the DKS network management framework is a unique component, and the redundant failover methodology of the present invention is applied to the instances of the IP drivers throughout the distributed data processing system. Hence, IP drivers are used as exemplary network management framework components in the detailed description of the present invention that is presented below.

With respect to topology operations within the network management framework, the failover of an IP driver is a much more serious event than the failover of a simple endpoint. The IPOP service is distinct from the topology service. While the topology service supports the creation of topology objects, at any given time, the topology database preferably contains only topology objects that are needed in support of network management applications that are being used by the administrative users. When an administrative user desires to view a portion of the distributed data processing system, the topology service then creates the topology map that is needed by the administrative user. Prior to requesting a network-related operation on a particular scope, network, system, or endpoint, the administrative user is presented with a topology map; the administrative user may then request a network-related operation with respect to an object in the topology database as presented within a GUI in a network management application.

As the IPOP database is updated, the topology database is updated as necessary in order to maintain the accuracy of the topology information that is being used at any given time. If an IP driver has actually failed, then some information that might have been stored within the distributed IPOP database may not have been reflected in the distributed topology database. In other words, after an IP driver failover event, the topology information that was previously stored within a topology database may be inaccurate because it does not reflect the current topology of the system. Thereafter, any operations within the network management framework that rely on the topology information might be subject to error or failure. Hence, in order to maintain the integrity of the topology database, the topology database and the IPOP database may need to be resynchronized.

Figure 8A:
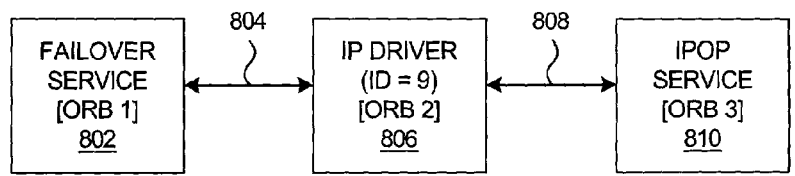
FIGS. 8A-8C is a set of block diagrams depicting a set of states for a failover service that is monitoring an IP driver.
Figure 8B:
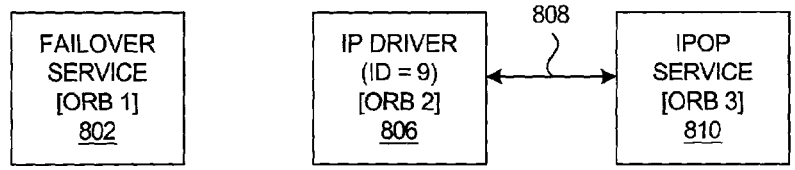
Figure 8C:
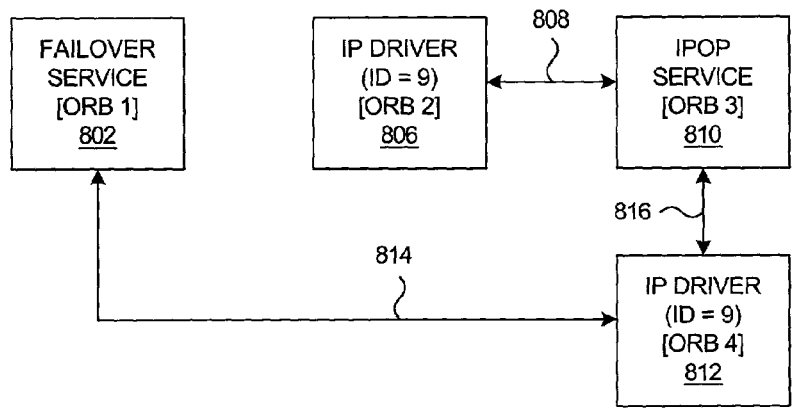

However, the maintenance of the topology database is complicated by the many ways that an IP driver may be determined to have failed. In addition to the hardware and software failures mentioned above, it may also be determined that an IP driver has failed because one of the communication links that is being used to monitor the IP driver has failed. For example, a failover service may monitor the IP drivers via a communication link, and a failover service may fail in its attempt to communicate with an IP driver, thereafter concluding that the IP driver has failed. Meanwhile, the IP driver may have continued to operate and to update the IPOP database. FIGS. 8A-8C show a more detailed example of a problem that may be caused by an IP driver failure.

With reference now to FIGS. 8A-8C, a set of block diagrams depict a set of states for a failover service that is monitoring an IP driver. Referring to FIG. 8A, failover service 802 is supported on ORB 1 and communicates via communication link 804 with IP driver 806, which is supported on ORB 2 and has an IP driver ID equal to "9". IP driver 806 then communicates with IPOP service 810, i.e. an instance of an IPOP service manager, which is supported on ORB 3. FIG. 8B shows the same organization of components as FIG. 8A except that communication link 804 has failed, thereby preventing failover service 802 from communicating with IP driver 806.

When failover service 802 detects that it can no longer communicate with IP driver 806, it determines that IP driver 806 may have failed and initiates a failover process. FIG. 8C shows the result of the failover process. Failover service 802 has started another instance of an IP driver; failover service 802 communicates with IP driver 812 via communication link 814. Failover service 802 configures IP driver 812 with the same responsibilities as the failed IP driver that IP driver 812 is replacing. In other words, IP driver 812 is configured to have the same scope as the failed IP driver; these configuration parameters may be provided within a configuration service in the DKS system.

A problem may arise when the new IP driver is automatically started within the network management framework. Preferably, IP drivers that are responsible for the same scope would have the same identifiers; in this example, IP driver 812 has IP driver ID "9", and IP driver 806, which IP driver 812 is intended to replace, has IP driver ID "9". Hence, in one embodiment, the system can detect a condition of duplicate network management framework components, e.g., duplicate IP drivers, through the duplication of unique identifiers. Preferably, though, a condition of duplicate network management framework components is detected more generally by determining that two network management framework components are similarly configured or are performing similar duties within the network management framework.

Given the distributed data processing nature of the system in which the present invention is implemented, failover service 802 does not have control over the location at which the new instance of the IP driver is initialized. In this example, IP driver 812 has been started on a different ORB, which in the example shown in FIG. 8C is ORB 4. Adding to the complexity of the scenario, IP driver 806 may actually still be running because only communication link 804 failed.

To solve or "self-correct" this problem of multiple, concurrently running, IP drivers that have been configured to be responsible for the same scope, even though each scope should have only a single IP driver assigned to it, the IPOP service terminates connections between the IPOP service and unwanted IP drivers in order to block IPOP writes from a presumed failed IP driver. If unwanted IPOP writes are received from a replaced IP driver that somehow attempts to communicate with the IPOP service after the IP driver has been replaced, then the IPOP service can instruct the replaced IP driver instance to shutdown. After the new instance of an IP driver has been started, the IPOP database and the topology database are resynchronized. These processes are described in more detail below with respect to the remaining figures.

Figure 9A:
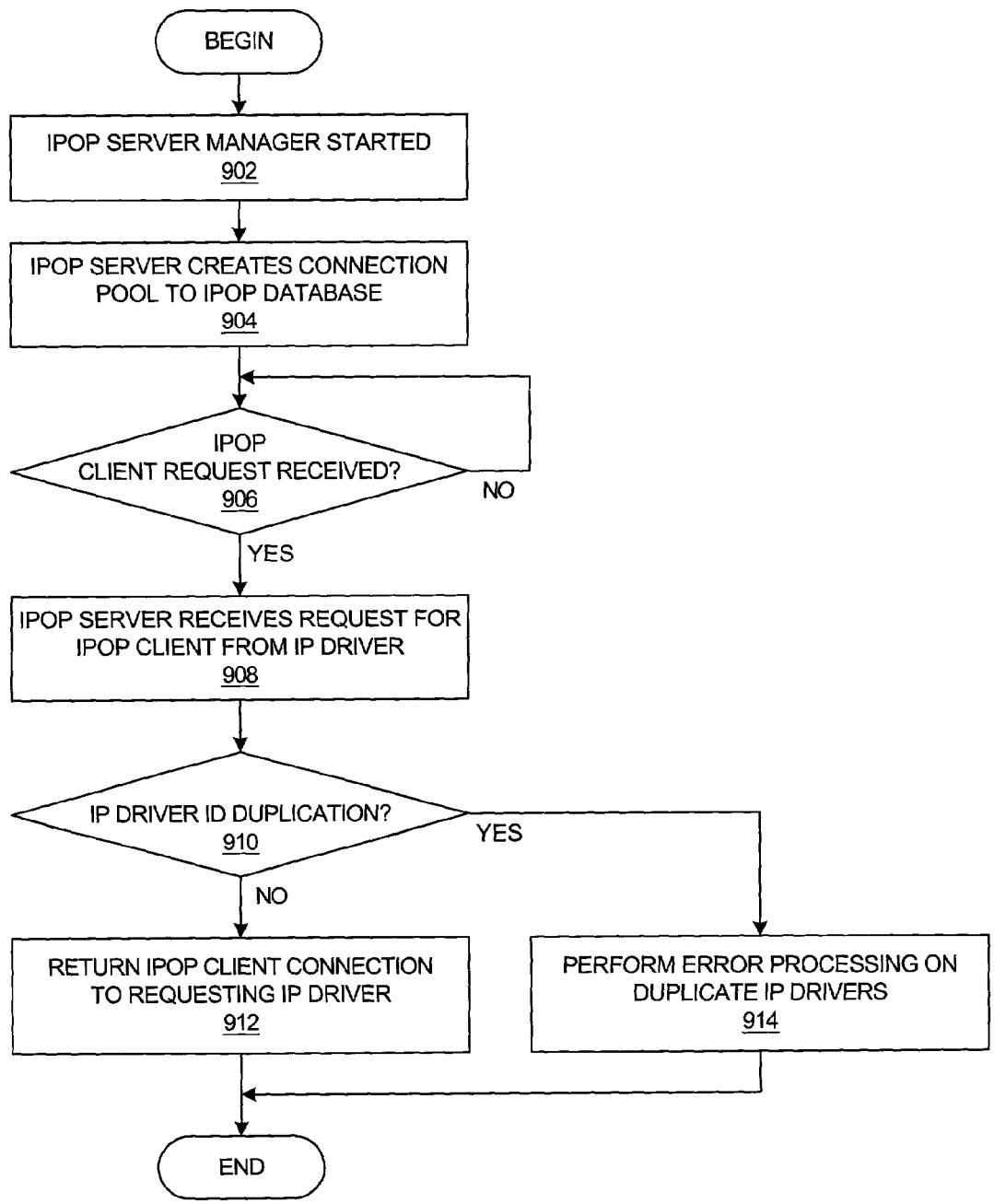
FIGS. 9A-9B are a pair of flowcharts that depict a process for granting an IPOP connection to an IP driver in accordance with a preferred embodiment of the present invention.
Figure 9B:
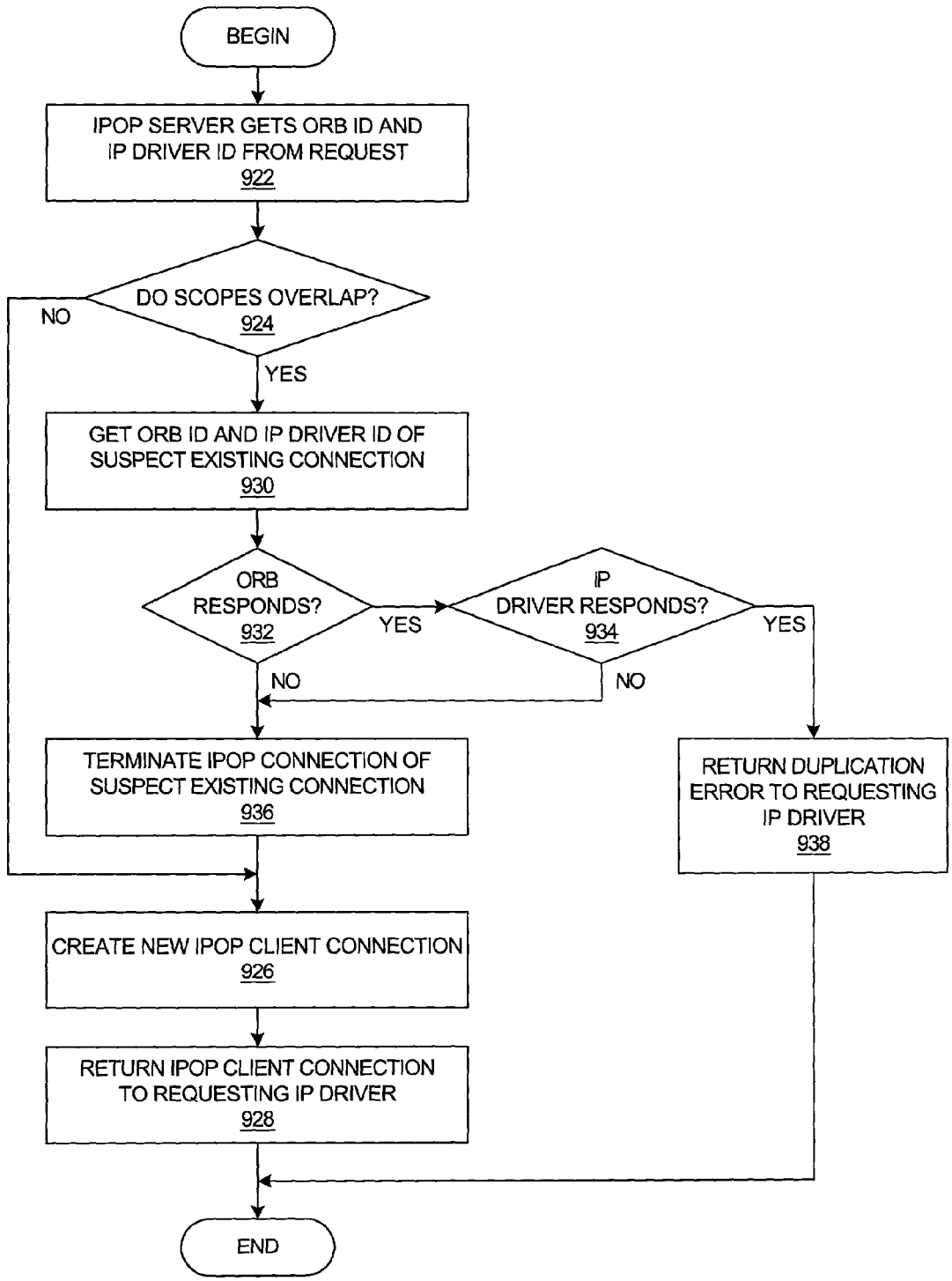

With reference now to FIGS. 9A-9B, a pair of flowcharts depicts a process for granting an IPOP connection to an IP driver in accordance with a preferred embodiment of the present invention. The process starts when an IPOP server, i.e. an instance of an IPOP service manager, is started on an ORB (step 902), after which the IPOP server sets up a pool of connections for the IPOP database (step 904); the extent of the connection pool may be based on a variety of configuration parameters that are available from the configuration service. The IPOP server then waits for an IPOP client request from an IP driver that is attempting to connect to the IPOP database to perform data I/O to the IPOP database. A determination is made as to whether an IPOP client request has been received (step 906), and if not, the IPOP server cycles. At some point in time, the IPOP server receives an IPOP client request (step 908), and the IPOP server attempts to service the request.

The IPOP server then determines whether the IP driver that has submitted the request for the IPOP client connection is a duplicate of another IP driver that has already established an IPOP client connection (step 910). If not, then the IPOP server returns an IPOP client connection to the requesting IP driver (step 912), and the process is complete. If the IP driver is determined to be a duplicate of another IP driver, then the IPOP server can perform the appropriate error processing on the duplicate IP drivers (step 914), and the process is complete.

Referring to FIG. 9B, a flowchart depicts the process of determining whether or not duplicate IP drivers exist and then performing the appropriate processing. In other words, FIG. 9B shows steps 910-914 of FIG. 9A in more detail.

The IPOP server obtains an IP driver ID and an ORB ID from the received client connection request (step 922). In one embodiment, the IPOP server could then checks its IP driver connection state data and determines whether or not the connection state data already contains the IP driver ID, i.e. the IPOP server determines whether or not a different IP driver instance with the same IP driver ID has already established an IPOP client connection. If not, then the requesting IP driver is not a duplicate of an IP driver that has already established an IPOP client connection.

In a preferred embodiment, duplicate IP drivers are detected through an overlap in the scopes for which the IP drivers have been configured and are responsible. Hence, a determination is made as to whether or not there is scope overlap between the IP driver that is requesting an IPOP client connection and an IP driver with an existing IPOP client connection (step 924). If there is no scope overlap, then the IPOP server creates a new IPOP client connection for the received request (step 926) and returns the newly established IPOP client connection to the requesting IP driver (step 928), thereby completing the processing of the request.

If there is scope overlap between the two IP drivers, then the viability of the IP driver with the established IPOP client connection is verified. At this point, the existing connection is suspect, so the ORB ID and the IP driver ID of the IP driver of the existing connection are retrieved from the IPOP connection state information, which is preferably stored within the distributed IPOP database (step 930). A determination is then made as to whether or not the ORB that supports the suspect IP driver has failed by checking whether the ORB responds to a test command from the IPOP server (step 932). If the ORB responds, then a determination is made as to whether the IP driver responds to a test command (step 934). In either case in which the ORB does not respond and/or the IP driver does not respond, then the IPOP server has determined that there is indeed something wrong with the system or communication links supporting the suspect IP driver, and the IPOP server terminates the existing IPOP connection from the IPOP connection pool (step 936). The IPOP server then provides a new IPOP client connection to the requesting IP driver at steps 926 and 928, and the process is complete.

If both the ORB and the IP driver respond, then the IP driver with the existing connection is active and has not failed, so the IP driver is no longer suspect and is determined to be viable. In this case, the IPOP server returns an error to the requesting IP driver that there are duplicate IP drivers running (step 938), and the process is complete.

At this point, an IPOP server may optionally attempt to shutdown a duplicate IP driver rather than assuming that the duplicate IP driver will self-terminate. The IPOP server could send a request to the appropriate ORB to shutdown the duplicate IP driver that is operating on that ORB. Alternatively, the IPOP server may notify a failover service that may be able to shutdown network management framework components. As part of its own shutdown procedure, the IP driver may attempt to terminate its IPOP client connection if it had received one, which may or may not still be a valid connection. In response, the appropriate IPOP server would remove the connection from the IPOP client connection state data.

Figure 9C:
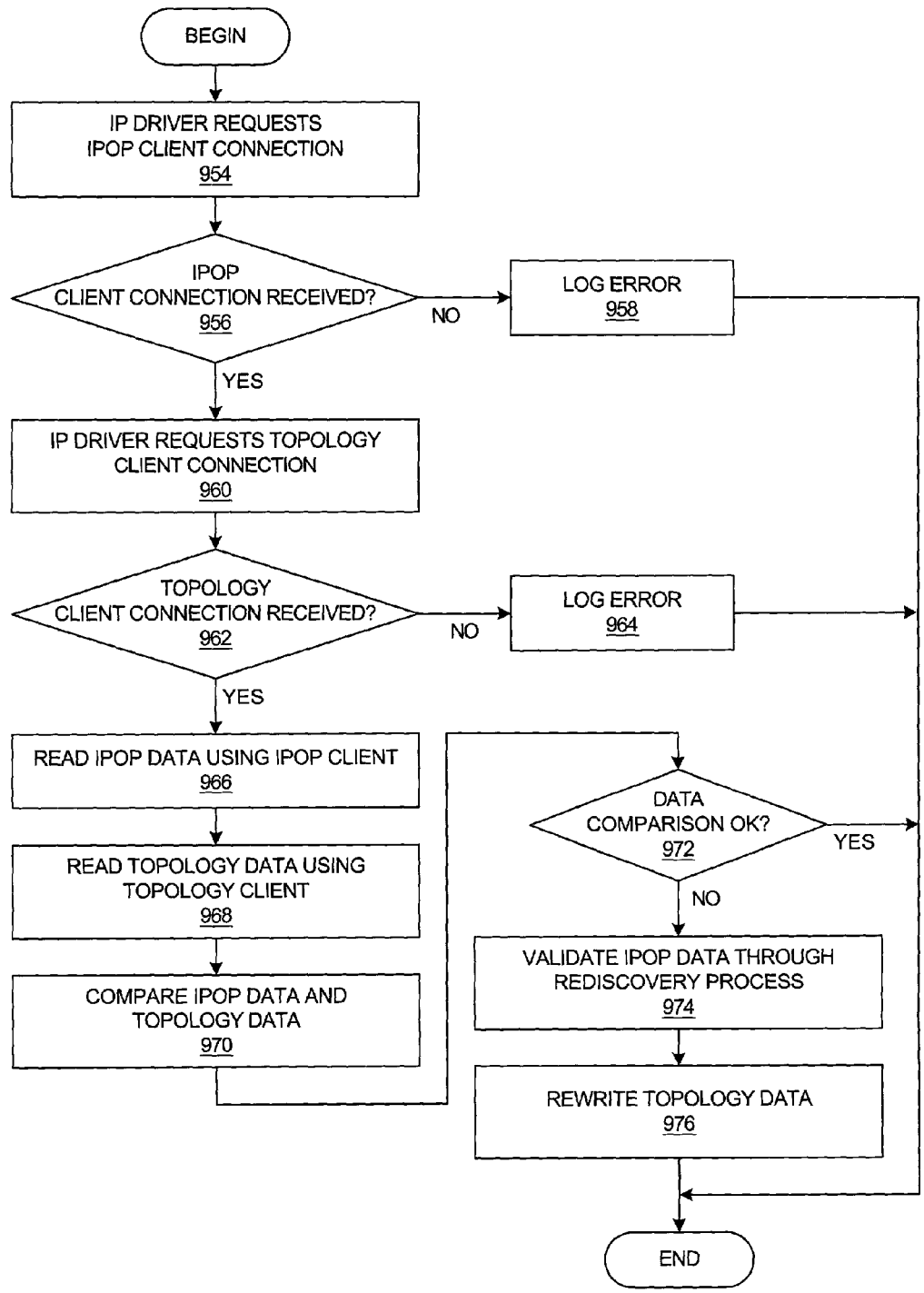
FIG. 9C is a flowchart that depicts a process for restarting an IP driver in accordance with a preferred embodiment of the present invention.

With reference now to FIG. 9C, a flowchart depicts a process for restarting an IP driver in accordance with a preferred embodiment of the present invention. As noted above with respect to FIG. 8C, a failover service may determine that an IP driver has failed; the process shown in FIG. 9C depicts an attempt to restart a failed IP driver. The process begins with the failover service requesting an instance of an IP driver to be started (step 952); the new instance of the IP driver is provided its scope responsibility through the configuration service. The newly started IP driver eventually requests an IPOP client connection (step 954), which is processed in the manner shown in FIG. 9B. A determination is made as to whether or not the IP driver has subsequently received an IPOP client connection (step 956), and if not, then an error is logged (step 958), and the process is complete.

If an IPOP client connection is received, then the IP driver requests a topology client connection (step 960) in order to communicate with the topology service. A determination is made as to whether or not the IP driver has received a topology client connection (step 962), and if not, then an error is logged (step 964), and the process is complete.

Using the IPOP client connection, the IP driver reads the IP objects from the IPOP database into memory (step 966), and using the topology client connection, the IP driver reads the topology objects from the topology database into memory (step 968). The IP driver then compares the topology database objects to the IPOP database objects (step 970) as a type of a resynchronization process, and a determination is made as to whether or not the objects match (step 972).

When an IP driver restarts and needs to obtain all of the objects from the IPOP database, the IPOP service preferably provides only the objects that the IPOP service knows would be required by the IP driver for the resynchronization process. Otherwise, the IP driver would be burdened with retrieving potentially millions of objects, thereby creating an I/O bottleneck that blocks the completion of the important resynchronization process.

In a preferred embodiment, the IP mapper in the IP driver would perform the reconciliation of the topology data with the IPOP data by ensuring that all endpoints, systems, and networks in the IPOP data exist within the topology data as well as the appropriate relations. If the matching process is successful, then the process is complete. If the objects do not match, then a rediscovery process is performed by the IP driver, i.e. a new discovery process is performed on the networks, systems, and endpoints within the IP driver's scope, to ensure that the IPOP database has current and valid information, for which the IP driver initiates the deletion and creation of objects as needed (step 974). The topology database is then rewritten with the correct information (step 976), and the process is complete.

As noted above, at any given time, the topology database preferably contains only topology objects that are needed in support of network management applications that are being used by the administrative users. Hence, an important motivating factor for starting a new instance of an IP driver is to perform the resynchronization process as soon as possible so that the information within the topology database is as accurate as possible. Otherwise, an administrative user might be viewing a topology map that is inaccurate, and the administrative user might attempt to perform network-related actions that are not possible and would result in errors because the portion of the topology map on which the user requested an action is non-existent. Hence, it is preferable that an IP driver initially receives only the data that it requires to complete the resynchronization process in order to expedite the data load operation to the IP driver prior to the resynchronization process.

As noted previously, IP drivers are merely used as an example of one type of network management framework components for which the failover methodology of the present invention may be applied, and the failover methodology may be applied to other types of network management framework components. The manner in which this methodology may be generalized is explained below with respect to FIG. 10.

Figure 10:
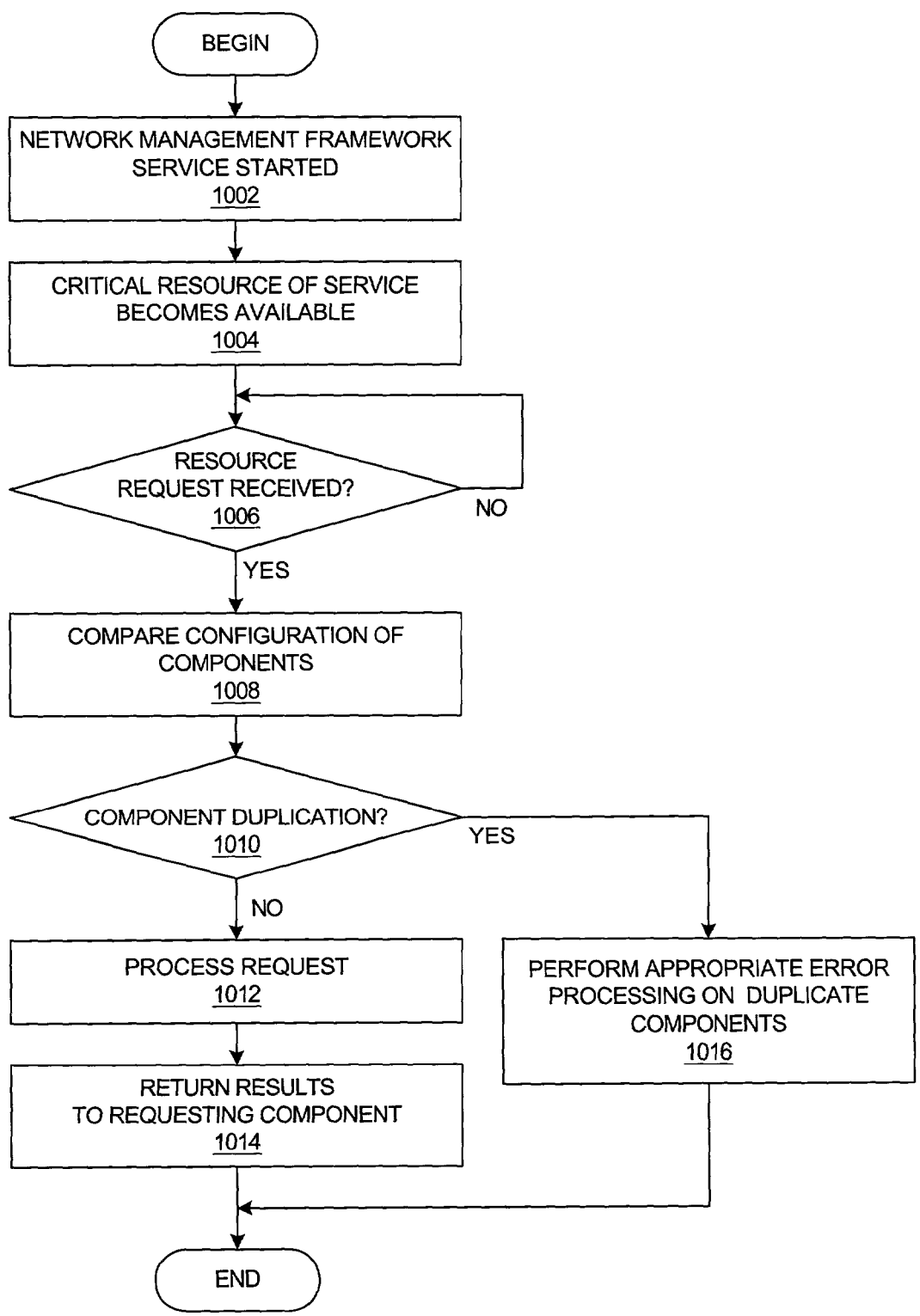
FIG. 10 is a flowchart that depicts a process for granting access to a critical resource controlled by a network management framework service as requested by a network management framework component in accordance with a preferred embodiment of the present invention.

With reference now to FIG. 10, a flowchart depicts a process for granting access to a critical resource controlled by a network management framework service as requested by a network management framework component in accordance with a preferred embodiment of the present invention. The process starts with a network management framework service being started (step 1002), and after its initialization, it is ready to accept requests for a critical resource (step 1004). A determination is made as to whether any requests for the resource have been received (step 1006), and if not, then the service merely cycles as it waits to process a request.

When a request is received, the network management framework service can obtain identity information of the requesting component from the resource request, and the configuration of the requesting component is then compared with the configurations of the components that have already been granted access to the resource (step 1008). If there are two components that have identical or even similar configurations, then it may be determined that they are duplicate components that are concurrently active.

If it is determined that the requesting component does not have a duplicate, then the request for the resource is granted and the request is processed (step 1010). After processing the request, the results are returned to the requesting component (step 1012), and the process is complete.

However, if it is determined that the requesting component does have a duplicate component, then appropriate error processing is performed on the duplicate components to ensure that only one of the duplicate components is operating at any given time (step 1016), and the process is complete.

In this manner, a duplication checkpoint is formed at the location of an operation that grants access to a particular type of critical resource that is provided by a network management framework service to a particular type of network management framework component. Because this particular type of network management framework component requires access to the critical resource, it can be correctly assumed that all instances of this type of network management framework component will eventually request access to the critical resource. Hence, the point at which access is granted for the resource becomes the most preferably location for self-correcting the aggressive failover technique of starting duplicate components. As each request for access to the critical resource is received, a process for checking for duplicate components may be inserted prior to granting access.

The advantages of the present invention should be apparent in view of the detailed description of the invention that is provided above. The present invention provides a flexible network management framework for discovering and monitoring endpoints within a distributed data processing system. The network management framework comprises an organization of distributed components that allows for the detection of the failed components within the network management framework. When a component is determined to have possibly failed, another instance of the component is started in an attempt to restart a potentially failed component. If the component has not actually failed, duplicate components may be active, and the network management framework detects the duplicate component and terminates the duplicate component. With respect to topology services on which many network management applications may rely, these components can be restarted while also ensuring that the distributed databases on which the components rely are maintained accurately.

It is important to note that while the present invention has been described in the context of a fully functioning data processing system, those of ordinary skill in the art will appreciate that the processes of the present invention are capable of being distributed in the form of instructions in a computer readable medium and a variety of other forms, regardless of the particular type of signal bearing media actually used to carry out the distribution. Examples of computer readable media include media such as EPROM, ROM, tape, paper, floppy disc, hard disk drive, RAM, and CD-ROMs and transmission-type media, such as digital and analog communications links.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A method for management of a distributed data processing system, the method comprising:
representing the distributed data processing system as a set of scopes, wherein a scope comprises a logical organization of network-related objects;
monitoring, by a computer, resources within the distributed data processing system using a set of distributed monitor controllers, wherein each distributed monitor controller is uniquely responsible for monitoring resources within different scopes;
in response to monitoring a set of resources, generating topology information associated with the set of resources by a first instance of a distributed monitor controller in the set of distributed monitor controllers;
in response to detecting a potential failure of the first instance of the distributed monitor controller, starting a second instance of the distributed monitor controller;
in response to monitoring the set of resources, generating topology information associated with the set of resources by the second instance of the distributed monitor controller; and
in response to a determination that generated topology information indicates assignment of overlapping scopes between the first instance of the distributed monitor controller and the second instance of the distributed monitor controller, determining a failure of the first instance of the distributed monitor controller based on a communication test.

2. The method of claim 1 further comprising:
attempting the communication test with the first instance of the distributed monitor controller;
in response to detecting a communication failure with the first instance of the distributed monitor controller, determining that the first instance of the distributed monitor controller is inactive; and
in response to detecting a communication success with the first instance of the distributed monitor controller, determining that the first instance of the distributed monitor controller is active.

3. The method of claim 2 further comprising:
in response to a determination that the first instance of the distributed monitor controller is active, requesting a shutdown of the second instance of the distributed monitor controller.

4. The method of claim 3 further comprising:
updating the topology information that was generated by the second instance of the distributed monitor controller.

5. The method of claim 2 further comprising:
in response to a determination that the first instance of the distributed monitor controller is inactive, updating the topology information that was generated by the first instance of the distributed monitor controller.

6. The method of claim 5 further comprising:
discovering a status associated with each resource in the set of resources via the second distributed monitor controller; and
rewriting topology information associated with each resource in the set of resources in accordance with the discovered status associated with each resource in the set of resources.

7. The method of claim 5 further comprising:
resynchronizing a resource status database with the topology information using the second distributed monitor controller.

8. The method of claim 7 further comprising:
determining a portion of the resource status database that is necessary for resynchronizing the topology information; and
retrieving only the determined portion of the resource status database.

9. The method of claim 1 further comprising:
attempting the communication test with an object request broker (ORB) that supports the first instance of the distributed monitor controller;
in response to detecting a communication failure with the ORB that supports the first instance of the distributed monitor controller, determining that the first instance of the distributed monitor controller is inactive; and
requesting a shutdown of the first instance of the distributed monitor controller.

10. An apparatus for management of a distributed data processing system, the apparatus comprising:
- means for representing the distributed data processing system as a set of scopes, wherein a scope comprises a logical organization of network-related objects;
- means for monitoring resources within the distributed data processing system using a set of distributed monitor controllers, wherein each distributed monitor controller is uniquely responsible for monitoring resources within different scopes;
- means for generating topology information associated with a set of resources by a first instance of a distributed monitor controller in the set of distributed monitor controllers in response to monitoring the set of resources;
- means for starting a second instance of the distributed monitor controller in response to detecting a potential failure of the first instance of the distributed monitor controller;
- means for generating topology information associated with the set of resources by the second instance of the distributed monitor controller in response to monitoring the set of resources; and
- means for determining a failure of the first instance of the distributed monitor controller based on a communication test in response to a determination that generated topology information indicates assignment of overlapping scopes between the first instance of the distributed monitor controller and the second instance of the distributed monitor controller.

11. The apparatus of claim 10 further comprising:
- means for attempting the communication test with the first instance of the distributed monitor controller;
- means for determining that the first instance of the distributed monitor controller is inactive in response to detecting a communication failure with the first instance of the distributed monitor controller; and
- means for determining that the first instance of the distributed monitor controller is active in response to detecting a communication success with the first instance of the distributed monitor controller.

12. The apparatus of claim 11 further comprising:
- means for requesting a shutdown of the second instance of the distributed monitor controller in response to a determination that the first instance of the distributed monitor controller is active.

13. The apparatus of claim 12 further comprising:
- means for updating the topology information that was generated by the second instance of the distributed monitor controller.

14. The apparatus of claim 11 further comprising:
- means for updating the topology information that was generated by the first instance of the distributed monitor controller in response to a determination that the first instance of the distributed monitor controller is inactive.

15. The apparatus of claim 14 further comprising:
- means for discovering a status associated with each resource in the set of resources via the second distributed monitor controller; and
- means for rewriting topology information associated with each resource in the set of resources in accordance with the discovered status associated with each resource in the set of resources.

16. The apparatus of claim 14 further comprising:
- means for resynchronizing a resource status database with the topology information using the second distributed monitor controller.

17. The apparatus of claim 16 further comprising:
- means for determining a portion of the resource status database that is necessary for resynchronizing the topology information; and
- means for retrieving only the determined portion of the resource status database.

18. The apparatus of claim 10 further comprising:
- mean for attempting the communication test with an object request broker (ORB) that supports the first instance of the distributed monitor controller; and
- means for determining that the first instance of the distributed monitor controller is inactive in response to detecting a communication failure with the ORB that supports the first instance of the distributed monitor controller.

19. A computer program product on a non-transitory computer readable medium for use in managing a distributed data processing system, the computer program product comprising:
- instructions for representing the distributed data processing system as a set of scopes, wherein a scope comprises a logical organization of network-related objects;
- instructions for monitoring resources within the distributed data processing system using a set of distributed monitor controllers, wherein each distributed monitor controller is uniquely responsible for monitoring resources within different scopes;
- instructions for generating topology information associated with a set of resources by a first instance of a distributed monitor controller in the set of distributed monitor controllers in response to monitoring the set of resources;
- instructions for starting a second instance of the distributed monitor controller in response to detecting a potential failure of the first instance of the distributed monitor controller;
- instructions for generating topology information associated with the set of resources by the second instance of the distributed monitor controller in response to monitoring the set of resources; and
- instructions for determining a failure of the first instance of the distributed monitor controller based response to a determination that generated topology information indicates assignment of overlapping scopes between the first instance of the distributed monitor controller and the second instance of the distributed monitor controller.

20. The computer program product of claim 19 further comprising:
- instructions for attempting the communication test with the first instance of the distributed monitor controller;
- instructions for determining that the first instance of the distributed monitor controller is inactive in response to detecting a communication failure with the first instance of the distributed monitor controller; and
- instructions for determining that the first instance of the distributed monitor controller is active in response to detecting a communication success with the first instance of the distributed monitor controller.

21. The computer program product of claim 20 further comprising:
- instructions for requesting a the shutdown of the second instance of the distributed monitor controller in response to a determination that the first instance of the distributed monitor controller is active.

22. The computer program product of claim 21 further comprising:
instructions for updating the topology information that was generated by the second instance of the distributed monitor controller.

23. The computer program product of claim 22 further comprising:
instructions for discovering a status associated with each resource in the set of resources via the second distributed monitor controller; and
instructions for rewriting topology information associated with each resource in the set of resources in accordance with the discovered status associated with each resource in the set of resources.

24. The computer program product of claim 22 further comprising:
instructions for resynchronizing a resource status database with the topology information using the second distributed monitor controller.

25. The computer program product of claim 24 further comprising:
instructions for determining a portion of the resource status database that is necessary for resynchronizing the topology information; and
instructions for retrieving only the determined portion of the resource status database.

26. The computer program product of claim 20 further comprising:
instructions for updating the topology information that was generated by the first instance of the distributed monitor controller in response to a determination that the first instance of the distributed monitor controller is inactive.

27. The computer program product of claim 26 further comprising:
instructions for attempting the communication test with an object request broker (ORB) that supports the first instance of the distributed monitor controller; and
instructions for determining that the first instance of the distributed monitor controller is inactive in response to detecting a communication failure with the ORB that supports the first instance of the distributed monitor controller.

* * * * *